(12) United States Patent
Koehl

(10) Patent No.: US 9,118,213 B2
(45) Date of Patent: Aug. 25, 2015

(54) PORTAL FOR HARVESTING ENERGY FROM DISTRIBUTED ELECTRICAL POWER SOURCES

(75) Inventor: Richard Koehl, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 1310 days.

(21) Appl. No.: 12/953,985

(22) Filed: Nov. 24, 2010

(65) Prior Publication Data

US 2012/0126623 A1    May 24, 2012

(51) Int. Cl.
  *H02J 3/00* (2006.01)
  *H02J 3/38* (2006.01)

(52) U.S. Cl.
  CPC ............... *H02J 3/383* (2013.01); *H02J 3/386* (2013.01); *Y02B 10/30* (2013.01); *Y02E 10/563* (2013.01); *Y02E 10/763* (2013.01); *Y10T 307/68* (2015.04); *Y10T 307/707* (2015.04)

(58) Field of Classification Search
  CPC ........... H02J 3/381; H02J 3/382; H02J 3/383; H02J 3/385
  USPC .......................................................... 307/82
  See application file for complete search history.

(56) References Cited

U.S. PATENT DOCUMENTS

| | | |
|---|---|---|
| 3,539,902 A | 11/1970 | Hickling |
| 3,875,494 A | 4/1975 | Gyugyi |
| 4,404,472 A | 9/1983 | Steigerwald |
| 4,725,740 A | 2/1988 | Nakata |
| 4,964,058 A | 10/1990 | Brown, Jr. |
| 5,073,848 A | 12/1991 | Steigerwald et al. |
| 5,191,518 A | 3/1993 | Recker et al. |
| 5,323,307 A | 6/1994 | Wolf et al. |
| 5,332,927 A | 7/1994 | Paul et al. |
| 5,473,533 A | 12/1995 | Mengelt |
| 5,532,525 A | 7/1996 | Kaiser et al. |
| 5,652,893 A | 7/1997 | Ben-Meir et al. |
| 5,724,237 A | 3/1998 | Hunter |
| 5,734,257 A | 3/1998 | Schauder et al. |
| 5,815,356 A | 9/1998 | Rodriguez et al. |
| 5,845,479 A | 12/1998 | Nakhamkin et al. |
| 5,929,538 A | 7/1999 | O'Sullivan et al. |
| 5,945,746 A | 8/1999 | Tracewell et al. |
| 5,952,733 A | 9/1999 | Johnston |

(Continued)

OTHER PUBLICATIONS

Unipower Corporation website, OEM Product Line, available since at least Dec. 9, 2010 (7 pages).

(Continued)

*Primary Examiner* — Fritz M Fleming
(74) *Attorney, Agent, or Firm* — Michael Best & Friedrich LLP

(57) ABSTRACT

A modular portal system and method for harvesting energy from distributed power sources. The distributed power sources include renewable and nonrenewable energy sources, which are coupled to a backplane. The backplane receives modular preconditioner modules and inverter modules, which are inserted into module slots. The preconditioner modules receive power from the distributed power sources via backplane connections and output conditioned DC power to a DC bus on the backplane. The inverters are coupled to the DC bus, receive the DC power, and convert the DC power to AC power. The backplane also includes a controller for selectively coupling the energy harvesting system to a power grid. The AC power generated by the inverter is selectively applied to the power grid and to local loads.

16 Claims, 16 Drawing Sheets

(56) References Cited

U.S. PATENT DOCUMENTS

| | | | |
|---|---|---|---|
| 6,005,788 A | 12/1999 | Lipo et al. | |
| 6,104,624 A | 8/2000 | Iwamoto et al. | |
| 6,134,124 A | 10/2000 | Jungreis et al. | |
| 6,134,666 A | 10/2000 | De Nicolo | |
| RE37,182 E | 5/2001 | Fasullo et al. | |
| 6,252,785 B1 * | 6/2001 | Hagihara et al. | 363/71 |
| 6,297,980 B1 | 10/2001 | Smedley et al. | |
| 6,304,006 B1 | 10/2001 | Jungreis | |
| 6,317,345 B1 | 11/2001 | Hayward et al. | |
| 6,344,985 B1 | 2/2002 | Akerson | |
| 6,353,304 B1 | 3/2002 | Atcitty et al. | |
| 6,362,540 B1 | 3/2002 | Hill | |
| 6,369,461 B1 | 4/2002 | Jungreis et al. | |
| 6,370,050 B1 | 4/2002 | Pen et al. | |
| 6,372,978 B1 | 4/2002 | Cifaldi | |
| 6,404,655 B1 | 6/2002 | Welches | |
| 6,421,259 B1 | 7/2002 | Brooks et al. | |
| 6,428,918 B1 | 8/2002 | Fuglevand et al. | |
| 6,487,096 B1 | 11/2002 | Gilbreth et al. | |
| 6,507,128 B2 | 1/2003 | Kling et al. | |
| 6,512,966 B2 | 1/2003 | Lof et al. | |
| 6,515,858 B2 | 2/2003 | Rodriguez et al. | |
| 6,522,955 B1 | 2/2003 | Colborn | |
| 6,559,559 B2 | 5/2003 | Cratty | |
| 6,605,880 B1 | 8/2003 | Jaunich | |
| 6,605,881 B2 | 8/2003 | Takehara et al. | |
| 6,670,721 B2 | 12/2003 | Lof et al. | |
| 6,671,585 B2 | 12/2003 | Lof et al. | |
| 6,674,263 B2 | 1/2004 | Agbossou et al. | |
| 6,738,692 B2 * | 5/2004 | Schienbein et al. | 700/286 |
| 6,750,391 B2 | 6/2004 | Bower et al. | |
| 6,751,106 B2 | 6/2004 | Zhang et al. | |
| 6,761,581 B2 | 7/2004 | Takehara et al. | |
| 6,787,259 B2 | 9/2004 | Colborn et al. | |
| 6,801,019 B2 | 10/2004 | Haydock et al. | |
| 6,904,530 B2 | 6/2005 | Frank | |
| 6,914,418 B2 | 7/2005 | Sung | |
| 6,922,614 B2 | 7/2005 | Le Van Suu et al. | |
| 6,924,627 B1 | 8/2005 | Wobben | |
| 6,949,843 B2 | 9/2005 | Dubovsky | |
| 6,979,916 B2 | 12/2005 | Schienbein et al. | |
| 7,000,395 B2 | 2/2006 | Wai et al. | |
| 7,042,110 B2 | 5/2006 | Mikhail et al. | |
| 7,061,139 B2 | 6/2006 | Young et al. | |
| 7,064,969 B2 | 6/2006 | West | |
| 7,072,190 B2 | 7/2006 | Schlecht | |
| 7,072,194 B2 | 7/2006 | Nayar et al. | |
| 7,076,592 B1 | 7/2006 | Ykema | |
| 7,110,273 B2 | 9/2006 | Abe et al. | |
| 7,112,891 B2 | 9/2006 | Johnson et al. | |
| 7,117,044 B2 | 10/2006 | Kocher et al. | |
| 7,126,236 B2 * | 10/2006 | Harbourt et al. | 290/44 |
| 7,145,266 B2 | 12/2006 | Lynch et al. | |
| 7,157,803 B2 | 1/2007 | Meyers et al. | |
| 7,193,872 B2 | 3/2007 | Siri | |
| 7,209,838 B1 | 4/2007 | Wright et al. | |
| 7,227,278 B2 | 6/2007 | Realmuto et al. | |
| 7,230,819 B2 | 6/2007 | Muchow et al. | |
| 7,233,082 B2 | 6/2007 | Furuya et al. | |
| 7,239,044 B1 | 7/2007 | Atcitty et al. | |
| 7,242,104 B1 | 7/2007 | Johnson | |
| 7,245,032 B2 | 7/2007 | Willets et al. | |
| 7,245,035 B2 | 7/2007 | Anzioso et al. | |
| 7,256,506 B2 | 8/2007 | Johnson | |
| 7,269,034 B2 | 9/2007 | Schlecht | |
| 7,272,021 B2 | 9/2007 | Schlecht | |
| 7,274,573 B2 | 9/2007 | Sevakivi | |
| 7,288,291 B2 | 10/2007 | Maijala et al. | |
| 7,339,287 B2 | 3/2008 | Jepsen et al. | |
| 7,343,361 B2 | 3/2008 | Peljto et al. | |
| 7,359,223 B2 | 4/2008 | Datta et al. | |
| 7,378,820 B2 | 5/2008 | Liu et al. | |
| 7,397,142 B1 | 7/2008 | Cooper | |
| 7,400,110 B2 | 7/2008 | Potter et al. | |
| 7,411,308 B2 | 8/2008 | Parmley | |
| 7,436,079 B2 | 10/2008 | Meyers et al. | |
| 7,440,300 B2 | 10/2008 | Konishi et al. | |
| 7,456,513 B2 | 11/2008 | Meyers et al. | |
| 7,456,519 B2 * | 11/2008 | Takeda et al. | 307/64 |
| 7,456,523 B2 | 11/2008 | Kobayashi | |
| 7,463,500 B2 | 12/2008 | West | |
| 7,474,016 B2 | 1/2009 | Wang et al. | |
| 7,474,080 B2 | 1/2009 | Huff et al. | |
| 7,479,712 B2 | 1/2009 | Richert et al. | |
| 7,492,621 B2 | 2/2009 | Wobben | |
| 7,505,833 B2 | 3/2009 | Delmerico et al. | |
| 7,521,825 B2 | 4/2009 | Lasseter et al. | |
| 7,528,502 B2 | 5/2009 | Maeda | |
| 7,531,915 B2 | 5/2009 | Wang et al. | |
| 7,558,083 B2 | 7/2009 | Schlecht | |
| 7,560,906 B2 | 7/2009 | Liu et al. | |
| 7,564,702 B2 | 7/2009 | Schlecht | |
| 7,596,008 B2 | 9/2009 | Iwata et al. | |
| 7,602,626 B2 | 10/2009 | Iwata et al. | |
| 7,605,498 B2 | 10/2009 | Ledenev et al. | |
| 7,608,937 B1 | 10/2009 | Altenschulte | |
| 7,612,466 B2 | 11/2009 | Skutt | |
| 7,615,875 B1 | 11/2009 | Henneberg et al. | |
| 7,629,708 B1 | 12/2009 | Meyers et al. | |
| 7,633,770 B2 | 12/2009 | Datta et al. | |
| 7,633,775 B2 | 12/2009 | Datta et al. | |
| 7,656,059 B2 | 2/2010 | Wang et al. | |
| 7,667,963 B2 | 2/2010 | Illerhaus et al. | |
| 7,671,481 B2 | 3/2010 | Miller et al. | |
| 7,687,937 B2 | 3/2010 | Lasseter et al. | |
| 7,710,752 B2 | 5/2010 | West | |
| 7,733,670 B2 | 6/2010 | Feng et al. | |
| 7,783,390 B2 | 8/2010 | Miller | |
| 7,813,153 B2 | 10/2010 | Zacharias et al. | |
| 8,421,270 B1 * | 4/2013 | Miller et al. | 307/65 |
| 2002/0001175 A1 | 1/2002 | Unrein | |
| 2002/0190525 A1 | 12/2002 | Worden et al. | |
| 2003/0007369 A1 | 1/2003 | Gilbreth et al. | |
| 2003/0015876 A1 | 1/2003 | Ichinose et al. | |
| 2003/0031034 A1 | 2/2003 | Rodriguez et al. | |
| 2007/0076445 A1 | 4/2007 | Boke | |
| 2007/0164612 A1 * | 7/2007 | Wendt et al. | 307/45 |
| 2007/0184339 A1 | 8/2007 | Scheucher | |
| 2007/0271006 A1 | 11/2007 | Golden et al. | |
| 2008/0123375 A1 | 5/2008 | Beardsley | |
| 2008/0247200 A1 | 10/2008 | Karlecik-Maier | |
| 2008/0258470 A1 | 10/2008 | Khoo et al. | |
| 2008/0283118 A1 | 11/2008 | Rotzoll et al. | |
| 2009/0027932 A1 | 1/2009 | Haines et al. | |
| 2009/0078300 A1 | 3/2009 | Ang et al. | |
| 2009/0140576 A1 | 6/2009 | Yu et al. | |
| 2009/0160259 A1 | 6/2009 | Naiknaware et al. | |
| 2009/0189445 A1 | 7/2009 | Strizki | |
| 2009/0278405 A1 | 11/2009 | Stancu et al. | |
| 2009/0283129 A1 | 11/2009 | Foss | |
| 2009/0302686 A1 | 12/2009 | Fishman | |
| 2010/0067266 A1 | 3/2010 | Dommaschk et al. | |
| 2010/0072753 A1 | 3/2010 | Bell | |
| 2010/0141041 A1 | 6/2010 | Bose et al. | |
| 2010/0156185 A1 | 6/2010 | Kim et al. | |
| 2010/0156186 A1 | 6/2010 | Kim et al. | |
| 2010/0156188 A1 | 6/2010 | Fishman | |
| 2010/0181837 A1 | 7/2010 | Seeker et al. | |
| 2010/0194202 A1 | 8/2010 | Sun | |
| 2010/0198421 A1 | 8/2010 | Fahimi et al. | |
| 2010/0201197 A1 | 8/2010 | Shires et al. | |
| 2010/0208501 A1 | 8/2010 | Matan et al. | |

(56) References Cited

U.S. PATENT DOCUMENTS

| | | |
|---|---|---|
| 2010/0213768 A1 | 8/2010 | Faveluke |
| 2010/0253151 A1 | 10/2010 | Gerhardinger et al. |
| 2010/0264739 A1 | 10/2010 | Errington |
| 2010/0264744 A1* | 10/2010 | Schmitt et al. .................. 307/82 |
| 2011/0232714 A1* | 9/2011 | Bhavaraju et al. ............ 136/244 |

OTHER PUBLICATIONS

SMA Solar Technology website, Sunny Island 5048 / 5048-US, available since at least Feb. 8, 2011 (1 page).

SMA Solar Technology website, Sunny Boy 8000TL-US / 9000TL-US / 10000TL-US, available since at least Feb. 8, 2011 (1 page).

* cited by examiner

PORTAL FOR HARVESTING ENERGY FROM DISTRIBUTED ELECTRICAL POWER SOURCES

BACKGROUND

The present invention relates to energy harvesting from multiple power sources.

Conventionally, electrical power is generated at a utility company and transmitted over a power grid to homes, factories, and other facilities. These facilities pay for the amount of energy that they consume. Power distribution systems having this type of configuration have existed for many decades.

SUMMARY

Although centralized power generation and distribution systems have functioned well, more recently there is a desire to produce energy locally at homes and factories. Various issues arise when attempting to interface locally produced energy with power provided from a utility company over a grid. Further complications are presented when energy is generated by multiple local power sources, such as solar panels, wind turbines, and generators. Embodiments of the invention are directed to an energy harvesting system and method for use with distributed power sources.

In one embodiment, the invention provides a modular energy harvesting portal including a first preconditioner, a second preconditioner, a first inverter, a second inverter, a controller, and a backplane. The first preconditioner includes a first DC output and a first power input connectable to a first source, and is configured to convert a first type of power provided from the first source to a first DC level, and output the converted power at the first DC level. The second preconditioner includes a second DC output and a second power input connectable to a second source, and is configured to convert a second type of power provided from the second source to the first DC level, and output the converted power at the first DC level. The first inverter includes a first DC input and a first AC output, converts DC power received at the first DC input to AC power, and outputs AC power at the first AC output. The second inverter includes a second DC input and a second AC output, converts DC power received at the second DC input to AC power, and outputs AC power at the second AC output. The controller is configured to communicate with the first inverter, second inverter, first preconditioner, and second preconditioner. The backplane includes first and second preconditioner slots for receiving the first preconditioner and the second preconditioner, and first and second inverter slots for receiving the first inverter and the second inverter. The backplane further includes a DC bus connecting the first DC output, second DC output, first DC input, and second DC input, and an AC output bus connecting the first AC output and second AC output. The controller also selectively couples the AC output bus to an AC grid.

In another embodiment the invention provides a method of harvesting energy using a modular energy harvesting portal. The method includes receiving a first type of power from a first power source at a first preconditioner; converting the first type of power to first conditioned DC power at a first DC voltage level using the first preconditioner; and providing the first conditioned DC power to a DC bus on the backplane. The method further includes receiving a second type of power from a second power source at a second preconditioner; converting the second type of power to second conditioned DC power at the first DC voltage level using the second preconditioner; and providing the second conditioned DC power to the DC bus on the backplane. Additionally, the method includes receiving the first and second conditioned DC power at an inverter input coupled to the DC bus and converting, by the inverter, the first and second conditioned DC power to AC power. The method also includes outputting the AC power, single or three phase, to grid connection switches controlled by a controller and controlling the grid connection switches to connect the AC power to one of an AC grid and a local load.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
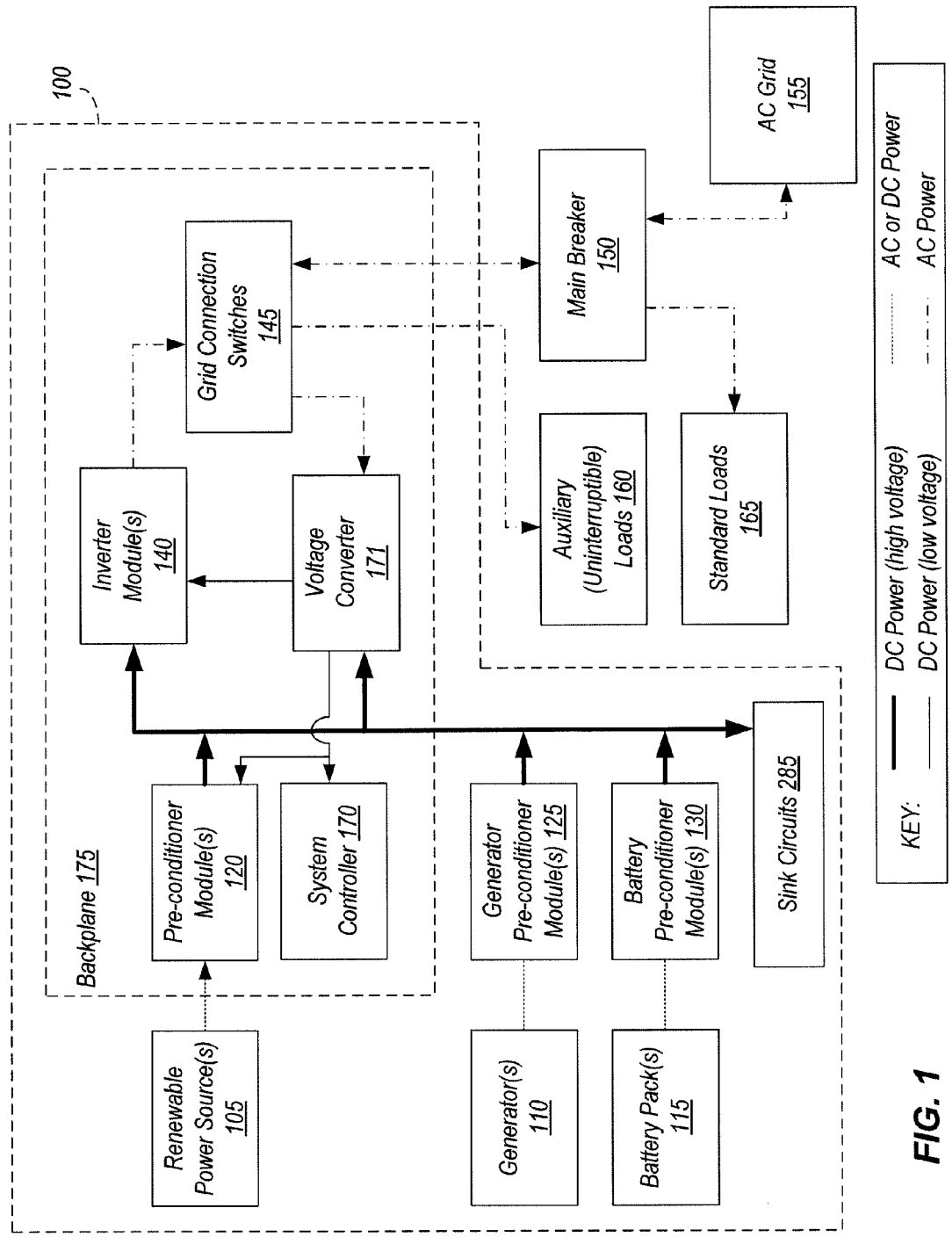
FIG. 1 depicts an energy harvesting system according to embodiments of the invention.

FIG. 1 depicts an energy harvesting system 100. The energy harvesting system 100 converts energy from renewable and other sources to AC power than can be sold to a utility company, used by local loads, or both. The distributed energy sources for the energy harvesting system 100 include renewable power sources 105, generators 110, and battery packs 115. Each energy source is coupled to one or more preconditioner modules (e.g., renewable power/energy preconditioner modules 120, generator preconditioner modules 125, and battery preconditioner modules 130), which receive AC or DC power output from their associated energy source. The received AC or DC power is converted by the preconditioner module to DC power with desired characteristics and output to a DC link bus 135. For instance, when the energy harvesting system 100 is operational, the preconditioner modules maintain the DC link bus 135 at a 325 VDC.

The DC link bus 135 is coupled to inverter modules 140. The inverter modules 140 convert DC power provided on the DC link bus 135 to AC power and output the AC power to the grid connection switches 145. The grid connection switches 145 are also coupled to a main breaker 150, which receives AC power from an AC grid 155. The grid connection switches 145 control the connection of the energy harvesting system 100 and the AC grid 155 to auxiliary loads 160. The energy harvesting system 100 is either grid-tied or off-grid, depending on the particular situation. When the AC grid 155 is operating normally, the energy harvesting system 100 is generally grid-tied. When grid-tied, the energy harvesting system 100 is operable to provide AC power from the AC grid 155 to auxiliary (uninterruptible) loads 160, provide power to the AC grid 155, or both. When the AC grid 155 is operating abnormally (e.g., during a black out or brown out), the energy harvesting system 100 uses the grid connection switches 145 to sever ties with the AC grid 155 to cease operating in the grid-tied mode. When off-grid, the grid connection switches 145 couple the AC power output from the inverter modules 140 to the auxiliary loads 160.

The AC grid 155 is a power grid including a system of transmission lines and other devices by which electrical power generated by an electric utility company is transmitted to customers. The main breaker 150 is a delivery point of the power from the AC grid 155 to a customer. The main breaker 150 is a conventional circuit breaker unit that is coupled to the AC grid 155. The main breaker 150 is operable to break the connection between the AC grid 155 and the grid connection switches 145 and standard loads 165 when current passing through the main breakers 150 exceeds a predetermined threshold. For instance, if the standard loads 165 draw excessive current, the main breaker 150 breaks the connection between the standards loads 165 and the AC grid 155.

The system controller 170 controls the grid connection switches 145 as described above to selectively couple the auxiliary loads 160 to AC power provided by the AC grid 155 or by the inverter modules 140. The system controller 170 also controls the grid connection switches 145 to selectively couple the AC power output from the inverter modules 140 to the AC grid (e.g., to sell locally generated power back to the utility company).

Figure 2:
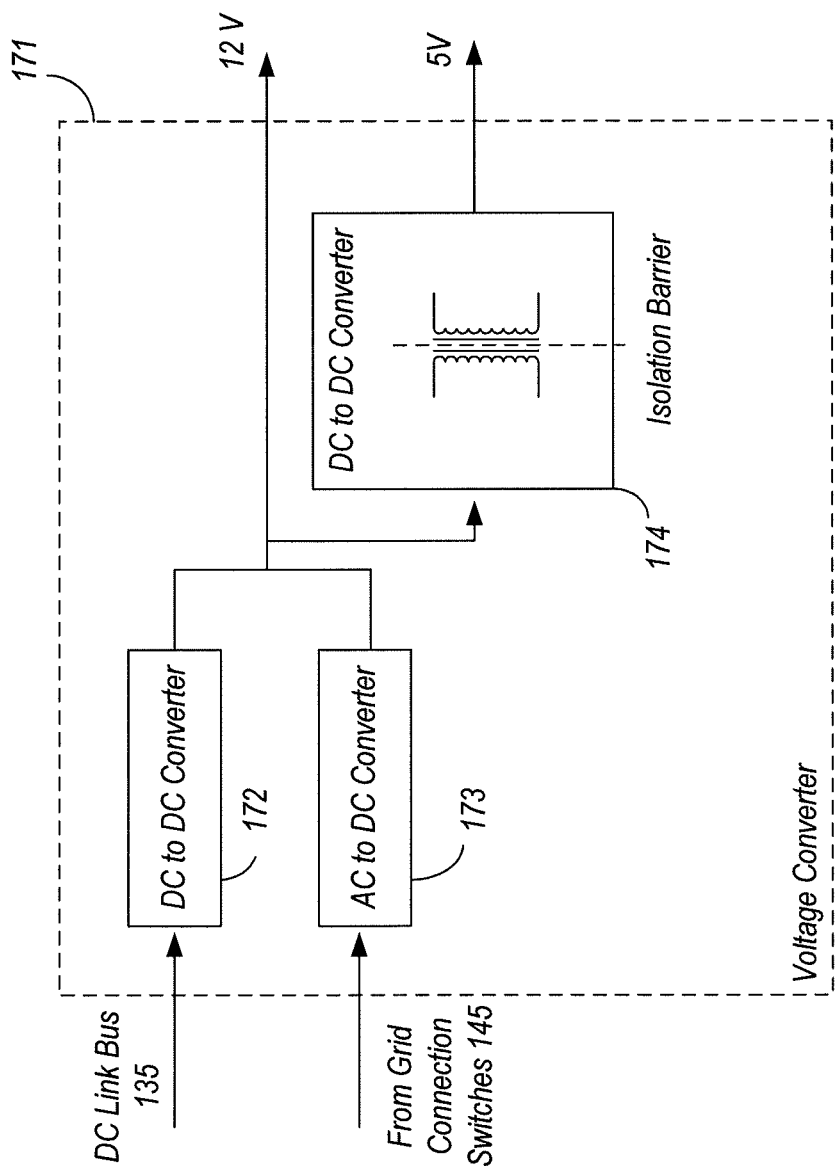
FIG. 2 depicts a voltage converter according to embodiments of the invention.

The system controller 170 receives power from a voltage converter 171. Turning to FIG. 2, the voltage converter 171 receives the DC link bus 135 and AC power from the grid connection switches 145, which provides AC power from one of the AC grid 155 and the inverter modules 140. The voltage converter 171 includes a DC to DC converter 172, which is operable to receive DC power from the DC link bus 135 and to step down the voltage to an appropriate level, e.g., 12 volts DC, for the hardware within the system controller 170. The voltage converter 171 also includes an AC to DC converter 173, which is operable to receive AC power from the grid connection switches 145. The AC to DC converter 173 converts the AC voltage to, for example, 12 volts DC. Also provided within voltage converter 171 is DC to DC converter 174, which receives the output DC voltage from either or both DC to DC converter 172 and AC to DC converter 173. The DC to DC converter 174 steps down the voltage further for certain logic hardware within the energy harvesting system 100 that requires a lower voltage input, e.g., 5 volts DC. The DC to DC converter 174 also provides an isolation barrier, which prevents voltage spikes that may be generated on the DC link bus 135 or from the grid connection switches 145 from reaching logic hardware downstream. In some embodiments, the voltage converter 171 receives power from only one of the DC link bus 135 and grid connection switches 145. In other embodiments, the voltage converter 171 includes one or more switches to selectively connect the DC link bus 135 and grid connection switches 145 to the voltage converter 171, thereby enabling the system controller 170 to select the power source for the voltage converter 171.

Figure 3:
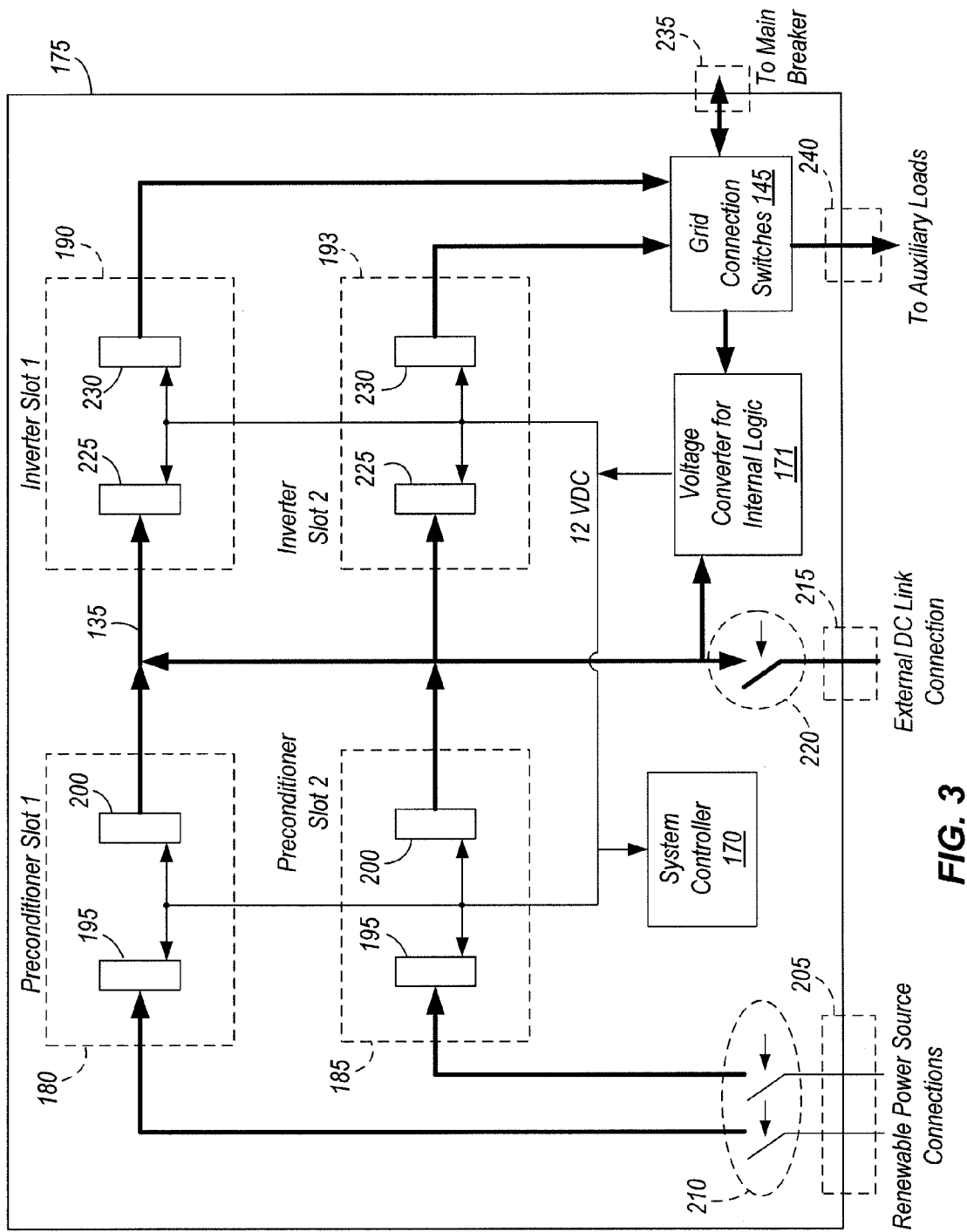
FIG. 3 depicts power connections for a backplane according to embodiments of the invention.

The preconditioner modules 120, inverter modules 140, grid connection switches 145, and system controller 170 are coupled to a backplane 175, which provides the interconnections between the components. FIG. 3 depicts the power interconnections of the backplane 175 in greater detail.

Backplane

As illustrated in FIG. 3, the backplane 175 includes physical connection points (e.g., slots) for preconditioner modules 120 and inverter modules 140, which are modular. For instance, the backplane 175 includes a preconditioner slot 180, a preconditioner slot 185, an inverter slot 190, and an inverter slot 193. The preconditioner slots 180 and 185 each receive one of the preconditioner modules 120 and the inverter slots 190 and 193 each receive one of the inverter modules 140.

The preconditioner slots 180 and 185 include connection points 195 and 200. The connection point 195 of each preconditioner slot 180 and 185 is coupled to one of the renewable power source connections 205. The source switches 210 are controlled by the system controller 170 and are operable to make and break the connection between the connection point 195 and the associated renewable power source. The connection point 200 of preconditioner slots 180 and 185 couples an inserted preconditioner module 120 to the DC link bus 135. The DC link bus 135 also includes an external preconditioner connection point 215 for coupling preconditioners external to the backplane 175, such as generator preconditioner modules 125 or battery preconditioner modules 130, to the DC link bus 135. External preconditioner modules are coupled together externally and then a single connection joins the external precondition modules to the external preconditioner connection point 215. In some embodiments, the backplane 175 includes multiple external preconditioner connection points 215 such that one or more external preconditioners are coupled to separate external preconditioner connection points 215. An external preconditioner switch 220 is provided along the DC link bus 135 to selectively make and break the connection between external preconditioners and the DC link bus 135 based on control signals from the system controller 170.

The inverter slots 190 and 193 each include a connection point 225, which couple an inserted inverter module 140 to the DC link bus 135. A connection point 230 of inverter slots 190 and 193 couple an inserted inverter module 140 to the grid connection switches 145. The backplane further includes a main breaker connection point 235 and auxiliary loads connection point 240 for coupling the grid connection switches 145 to the main breaker 150 and auxiliary loads 160, respectively.

As mentioned above, the preconditioner slots 180 and 185 and inverter slots 190 and 193 enable a modular system. Preconditioner modules 120 include preconditioners that are specific to particular power sources. For instance, one or more preconditioner modules 120 are particularly designed for use with a photovoltaic (PV) power source (such as a solar panel), while one or more different preconditioner modules 120 are particularly designed for use with a DC wind turbine. Thus, the backplane 175 is usable with different energy sources (solar, battery, generator, wind, etc.) by inserting the correct or appropriately configured preconditioner modules 120 in the preconditioner slots 180 and 185.

Figure 4B:
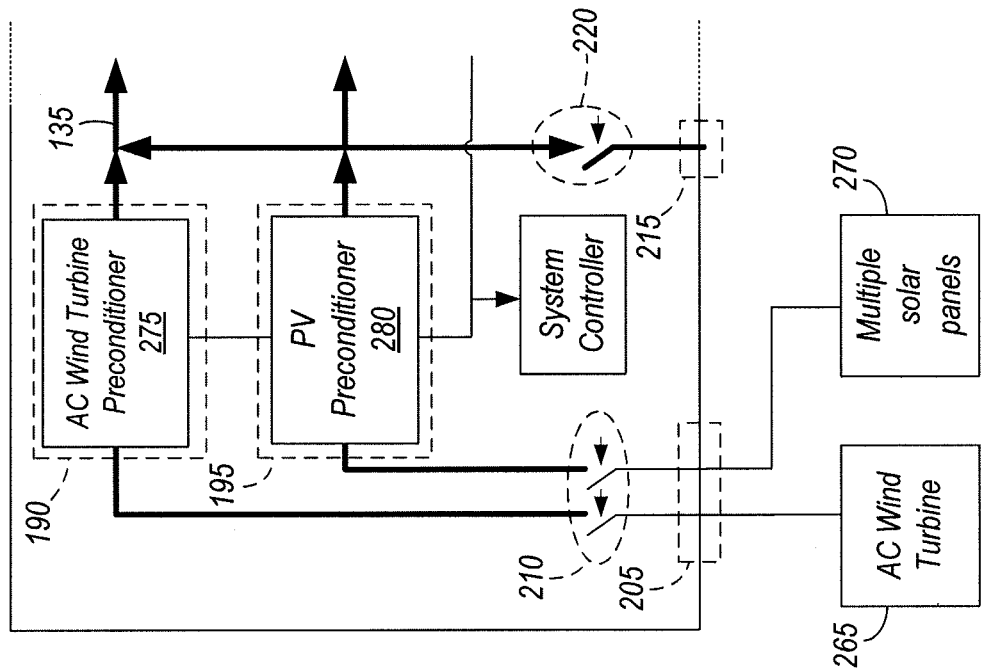
FIGS. 4A-B depict exemplary arrangements of preconditioner modules within a backplane according to embodiments of the invention.
Figure 4A:
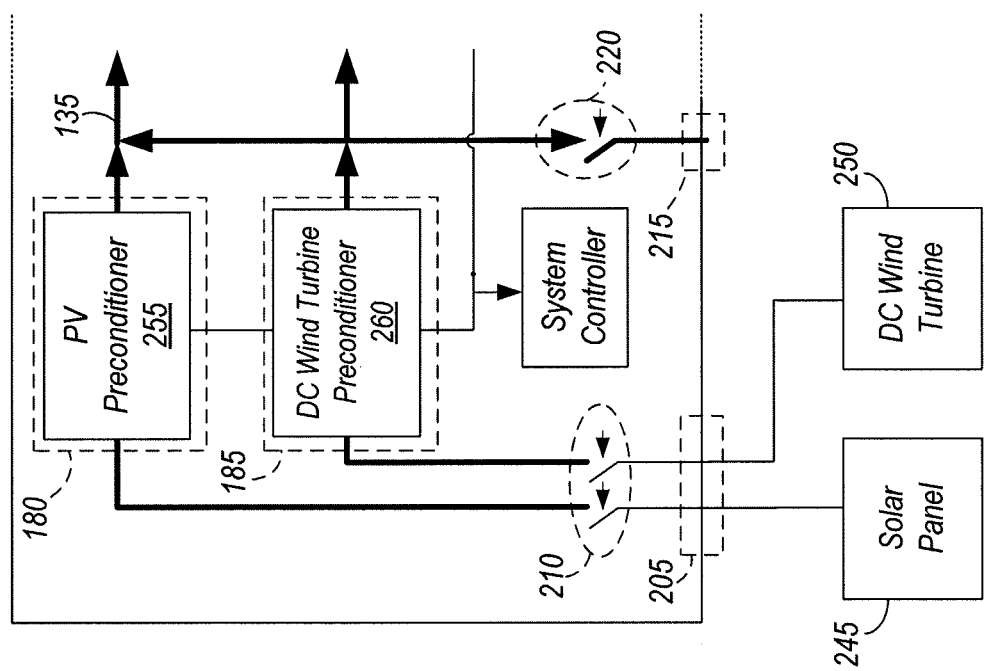

FIGS. 4A and 4B depict two exemplary arrangements of the backplane 175 with different renewable energy sources and preconditioner modules 120 (only a portion of the backplane 175 is depicted). The backplane 175 in FIG. 4A is coupled to a solar panel 245 and a DC wind turbine 250. Accordingly, the backplane 175 has a PV preconditioner 255 inserted within the preconditioner slot 180 and a DC wind turbine preconditioner 260 inserted in the preconditioner slot 185. The backplane 175 in FIG. 4B is coupled to an AC wind turbine 265 and multiple solar panels 270. Accordingly, the backplane 175 has an AC wind turbine preconditioner 275 inserted within the preconditioner slot 180 and a PV preconditioner 280 operable to accept multiple solar panel inputs inserted in the preconditioner slot 185. In some instances, the preconditioner 120 is a hybrid preconditioner that accepts multiple types of renewable power sources.

In some embodiments, non-renewable power sources (such as the generators 110) are coupled to internal preconditioners. For example, the generator preconditioner modules 125 are inserted into one or both of the preconditioner slots 180 and 185. In some embodiments, renewable power sources are coupled to external pre-conditioners. For example, the DC wind turbine 250 is coupled to DC wind turbine preconditioner 260, which resides external to the backplane 175 and is coupled to the backplane via the external DC link connection 215. As discussed above, additional or fewer preconditioner slots are provided in some embodiments of the backplane 175. For instance, an energy harvesting system 100 for residential use includes a backplane 175 with two preconditioner module 120 slots and two inverter module 140 slots, while an energy harvesting system 100 for commercial use includes a backplane 175 with four preconditioner module 120 slots and three inverter module 140 slots. Although the preconditioner slots and inverter slots are depicted at a one-to-one ratio in the backplane 175, other ratios are used in other embodiments of the invention. For example, an energy harvesting system 100 for industrial use includes a backplane 175 with six preconditioner module 120 slots and seven inverter module 140 slots.

Furthermore, preconditioner modules 120 and inverter modules 140 are removable by an end user of the energy harvesting system 100 "on-the-fly." That is, the energy harvesting system 100 is hot swappable such that even when it is fully operational (whether grid-tied or off-grid), an end user may remove or insert one or more preconditioner modules 120 or 140 without damaging components of the energy harvesting system 100 and without removing power from the auxiliary loads 160. As large voltages are stored on capacitors of the DC link bus 135 during operation, sink circuits 285 are provided to sink the voltage stored on the DC link bus 135 upon removal of a preconditioner module 120 or inverter module 140 from the backplane 175 (see, e.g., FIG. 1). In some embodiments, the preconditioner modules 120 and 140 are hardwired to the backplane 175, e.g., at the point of manufacture, such that they are not hotswappable or modular by an end-user.

Figure 4C:
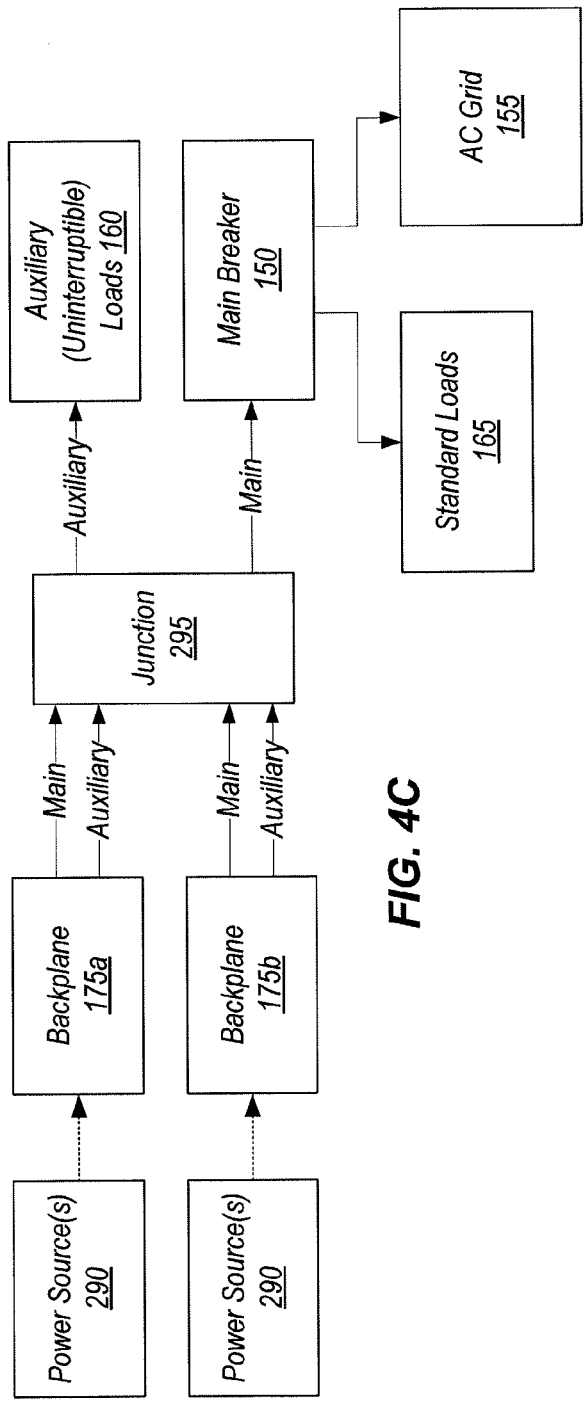
FIGS. 4C-F depict two linked backplanes according to embodiments of the invention.
Figure 4D:
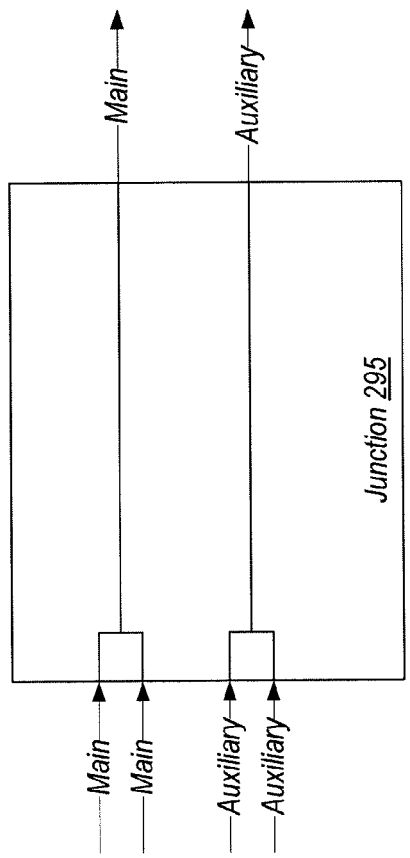

FIGS. 4C-D illustrate two backplanes 175a and 175b linked together. Backplanes 175a and 175b receive power from power sources 290, which include one or more renewable power sources 105, generators 110, and battery packs 115. Each backplane 175a and 175b has a main output for the main breaker 150 and an auxiliary output for the auxiliary loads 160, as shown in FIG. 1. The main and auxiliary outputs of each backplane 175a and 175b are received by a junction 295. The junction 295 couples the main outputs together and auxiliary outputs together. The junction 295 outputs a combined main output to the main breaker 150 and a combined auxiliary output to the auxiliary loads 160.

Figure 4E:
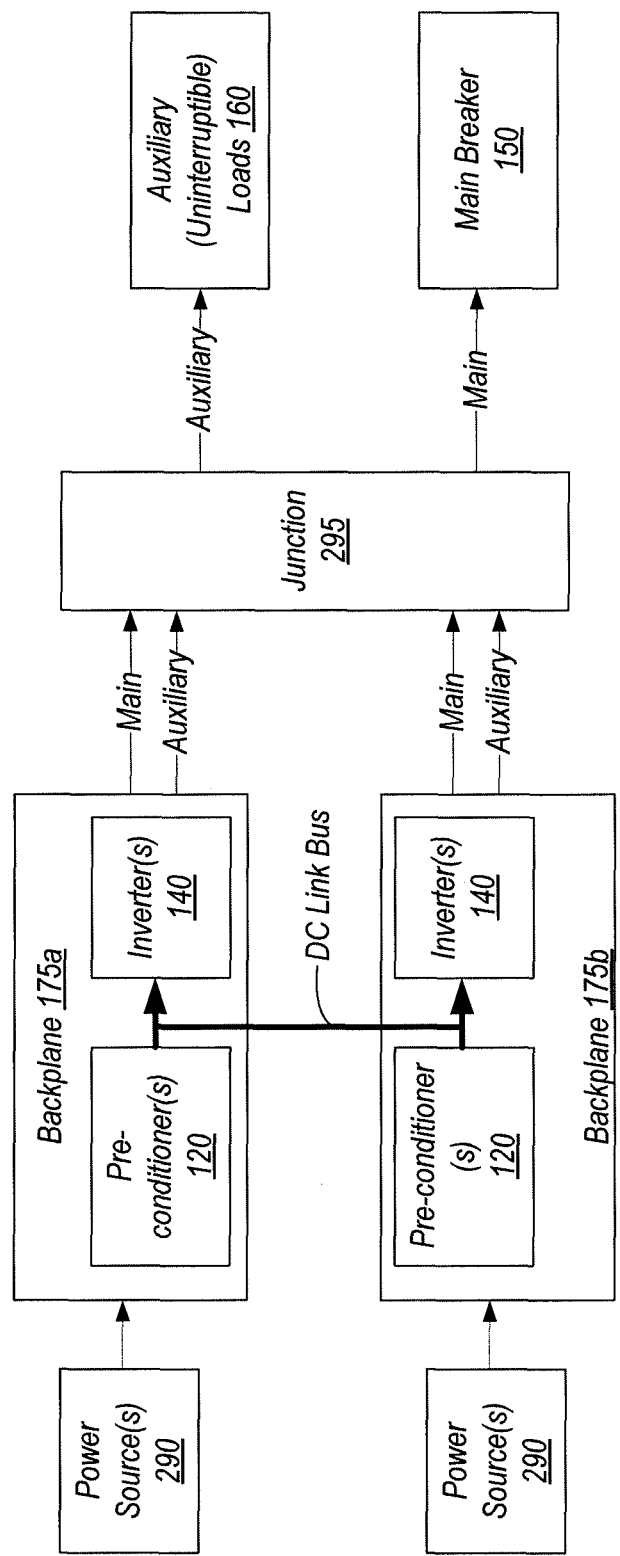
Figure 4F:
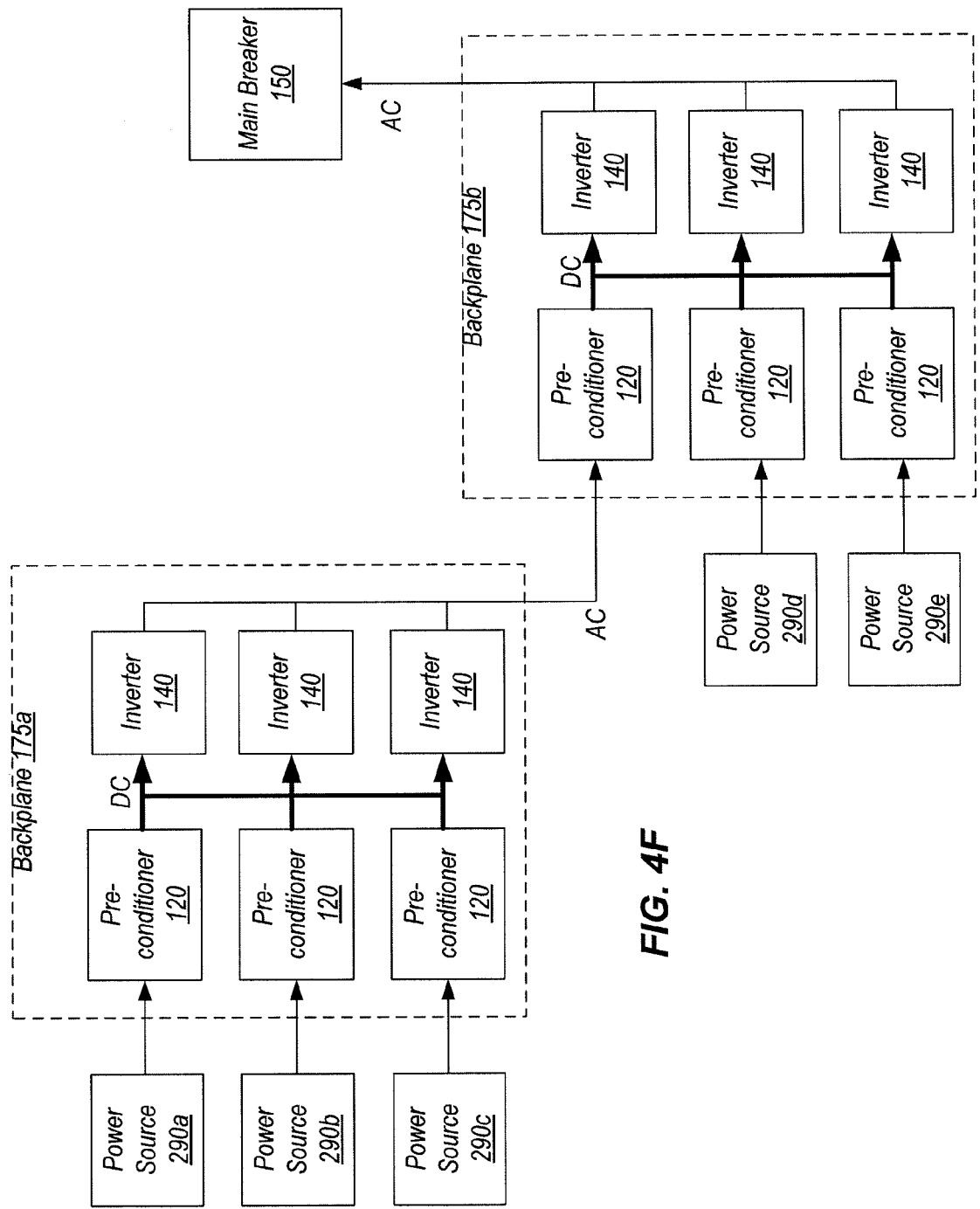

FIG. 4E illustrates another arrangement of backplanes 175a and 175b. In the arrangement of FIG. 4E, the DC link bus 135 of each backplane 175a and 175b are connected. For instance, the external preconditioner connection point 215 or a similar connection point is used to couple the DC link buses 135. In this arrangement, the DC power output by preconditioner modules 120 of each backplane 175a and 175b is shared among the inverter modules 140 of the each backplane 175a and 175b. FIG. 4F illustrates a series arrangement of backplanes 175a and 175b. In the arrangement of FIG. 4F, the AC output of the backplane 175a is coupled to a preconditioner 120 of 175b (a series preconditioner). The series preconditioner 120 receives the AC output from backplane 175a and outputs DC power to the DC link bus 135. This arrangement enables five power sources 290a, 290b, 290c, 290d, and 290e, increasing the number of power sources 290 that are usable in the system than would otherwise be available with only backplane 175a.

Figure 4G:
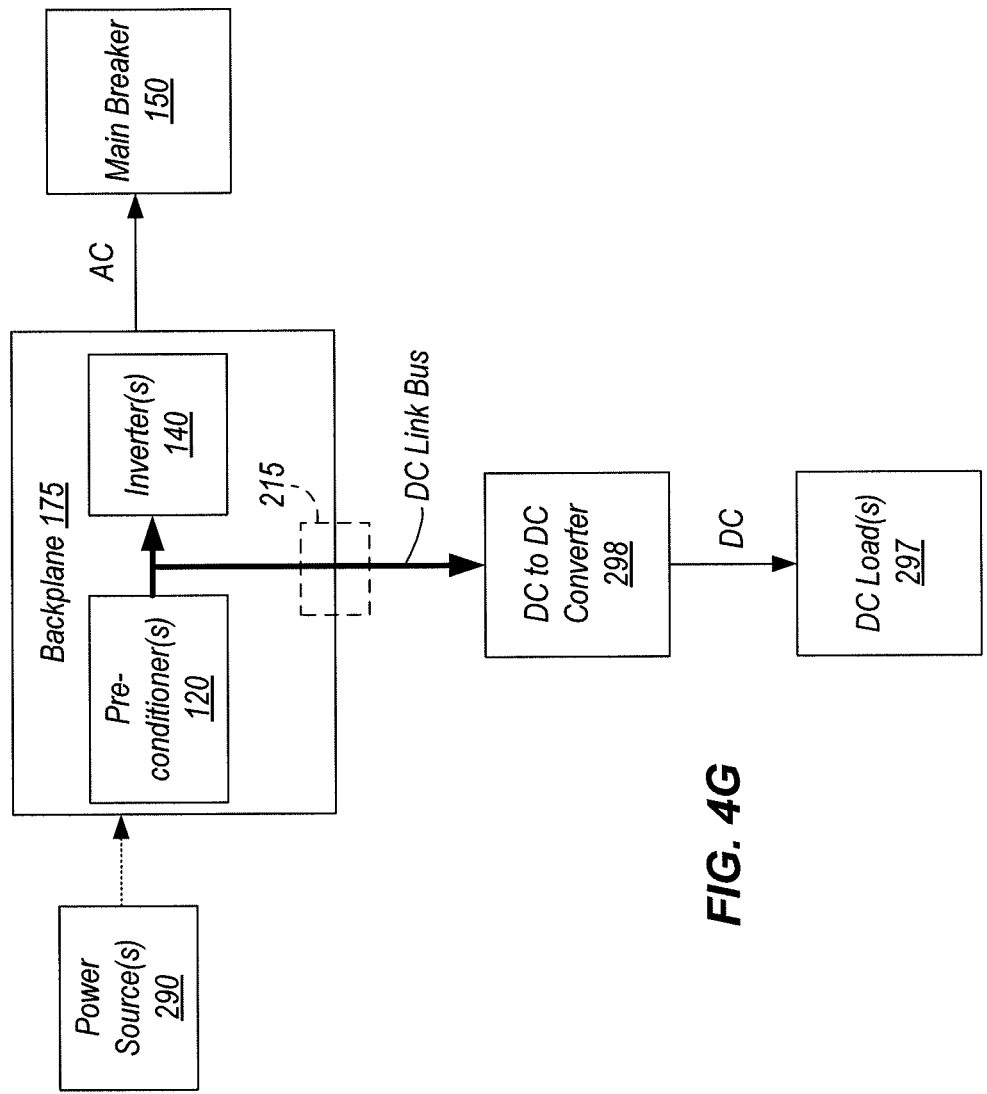
FIGS. 4G-H depict a backplane including a DC output according to embodiments of the invention.
Figure 4H:
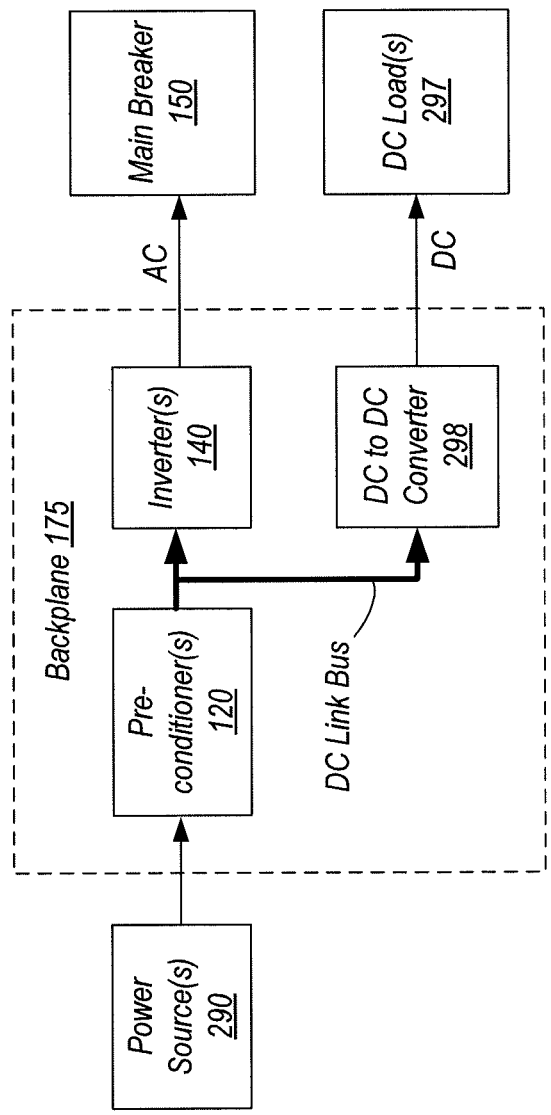

FIGS. 4G and 4H illustrate the backplane 175 for use with DC loads 297. In FIG. 4G, the DC link bus 135 is coupled to a DC to DC converter 298 via the external preconditioner connection point 215. The DC to DC converter 298 converts the DC power provided on the DC link bus 135 to a level appropriate for the DC loads 297. FIG. 4H operates similarly to the system of FIG. 4G, but incorporates the DC to DC converter 298 into the backplane 175. In some embodiments, the backplane 175 selectively enables and disables each of the AC output and DC output. For example, in response to a user selection of AC power, the DC output is disabled, and vice versa. In some embodiments, the voltage converter 171 is used to provide the functionality of the DC to DC converter 298. In these embodiments, the voltage converter 171 converts DC power on DC link bus 135 and/or AC power from grid connection switches 145 to provides a DC output to DC loads 297.

System Controller

Figure 5:
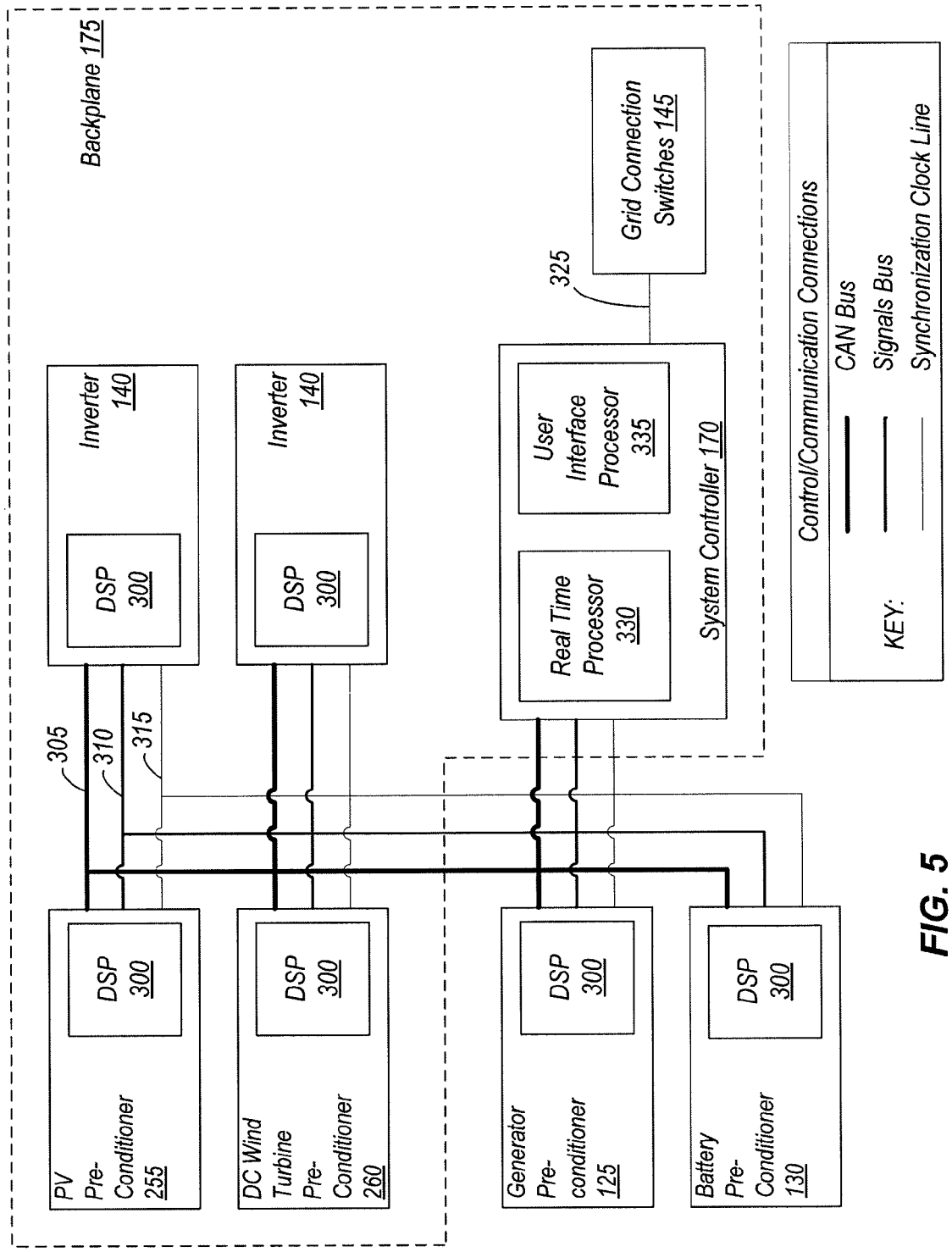
FIG. 5 depicts control signal connections for a backplane according to embodiments of the invention.

FIG. 5 illustrates interconnections used for communication within the backplane 175 and between the backplane 175 components and the external power sources and their preconditioners. The PV preconditioner 255 and DC wind turbine preconditioner 260, like other preconditioner modules 120 include a digital signal processor (DSP) 300. The inverter modules 140, generator preconditioner module 125, and battery preconditioner module 130 also each include a DSP 300. The DSP 300 of each module communicates with the system controller 170 to provide information to the system controller 170 and to receive and execute instructions generated by the system controller 170. Additionally, each DSP 300 is operable to control the module in which it resides.

A DSP suitable for use is a real time microcontroller manufactured by Texas Instruments and sold under the product name C2000™ (Delfino™) with product number TMS320F28335. Such DSPs include a 150 MHz clock, 16 12-bit Analog-to-Digital converters, 18 channel pulse width modulators, and dual control area network (CAN) media access controls (MACs). In some embodiments, one or more of the DSPs 300 are replaced with an application specific integrated circuit (ASIC), field programmable gate array (FPGA), or another controller including a combination of software and hardware used to perform similar functions as the DSPs 300.

The DSPs 300 are coupled to each other and the system controller 170 via: 1) the controller area network (CAN) bus 305, 2) signals bus 310, and 3) synchronization clock line 315. The CAN bus is used by the DSPs 300 to communicate to the system controller 170 the module type (e.g., PV preconditioner, inverter, etc.), voltage and current input and output levels, and other information. The system controller 170 uses the CAN bus to communicate instructions and data to the DSPs 300, such as setting a maximum current amount to the preconditioner modules 120. The system controller 170 also uses the CAN bus to receive instructions and data from the DSPs 300. As is known in the art, the CAN bus allows message prioritization and a broadcast-to-all protocol. The CAN bus has an approximate clock rate of 1 MHz and an effective bandwidth of 450 Kbps.

The signals bus 310 is made up of individual connections (e.g., conductive wires or fiber optics) to transfer individual signals at a high speed (e.g., faster than the CAN bus). Exemplary signals transmitted along the signals bus include: a reset signal, a get ready to shutdown power signal, a shutdown power immediately signal, a sleep/wakeup signal, and an island detected signal. The synchronization clock line 315 is similar to an individual connector within the signal bus 310 and transmits a clock signal generated by the system controller 170.

The backplane 175 also includes a switch bus 325 for the system controller 170 to send individual signals to switches within the grid connection switches 145.

The system controller 170 includes a real time processor 330 and user interface (UI) processor 335. The real time processor 330 is, for instance, a DSP such as DSP 300, and is powered by the 12 V output of the voltage converter 171. The real time processor 330 interacts with the components of the energy harvesting system 100 to monitor and control the components, and interacts with the UI processor 335. The UI processor 335 is, for instance, an Atmel AT91SAM9263 ARMS processor using an embedded LINUX operating system and including a CAN MAC, Wired Ethernet MAC, USB host for wireless Ethernet, and USB device for a service port. The UI processor 335 is powered by the 5 volt output of the voltage converter 171 and, therefore, is isolated by the DC to DC converter 174 from the AC grid 155, DC link bus 135, and inverter modules 140. As will be described in greater detail below, the UI processor 335 is the gateway between a user or service person and the energy harvesting system 100. The UI processor 335 does not directly control the components of the energy harvesting system 100. Rather, the UI processor 335 interacts with the real time processor 330, which controls the components of the energy harvesting system 100.

Preconditioner Modules

Figure 6A:
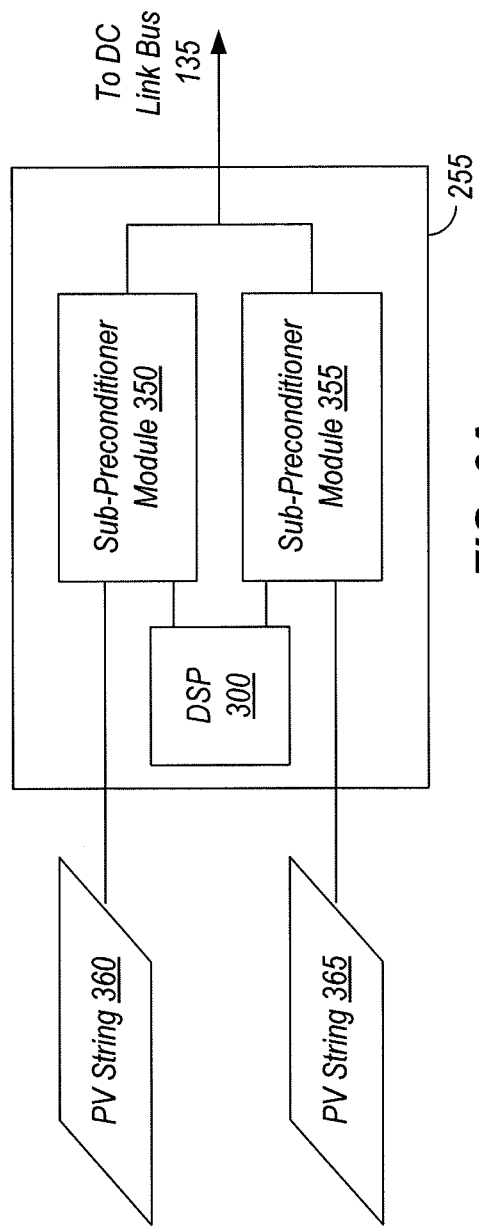
FIGS. 6A-B depict exemplary arrangements of preconditioner modules according to embodiments of the invention.
Figure 6B:
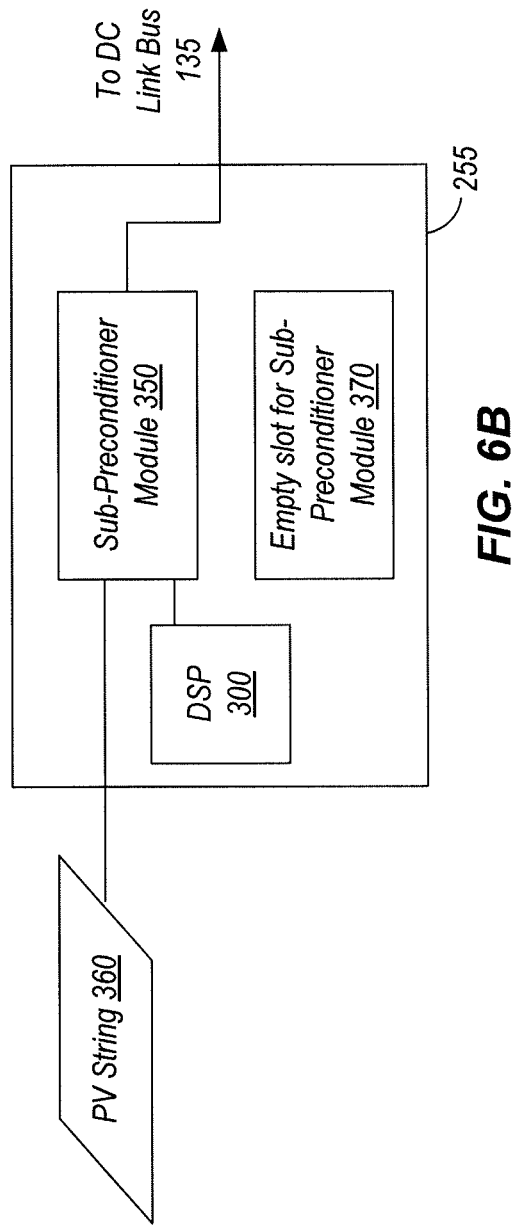
Figure 7:
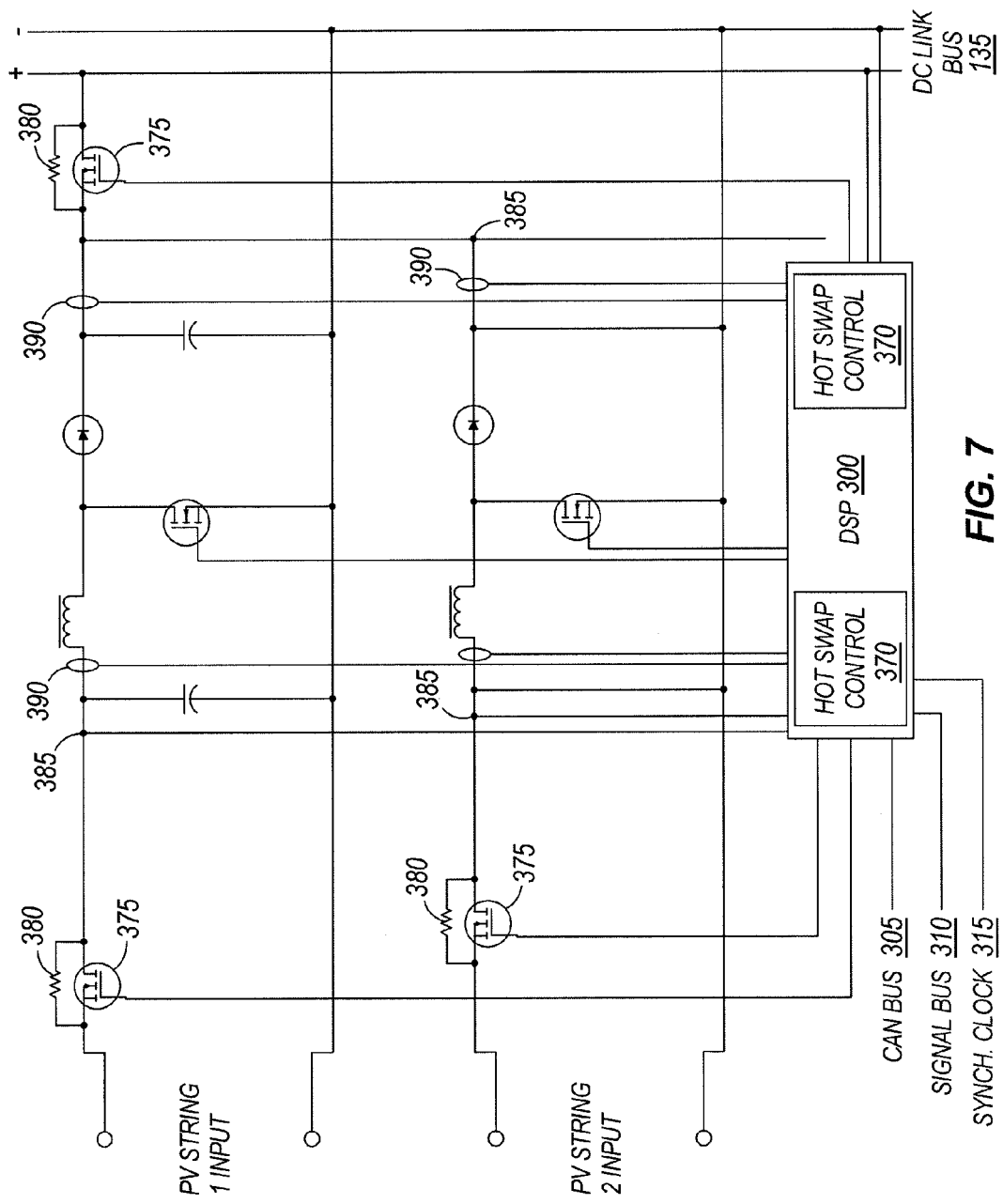
FIG. 7 depicts an exemplary photovoltaic preconditioner module according to embodiments of the invention.
Figure 8:
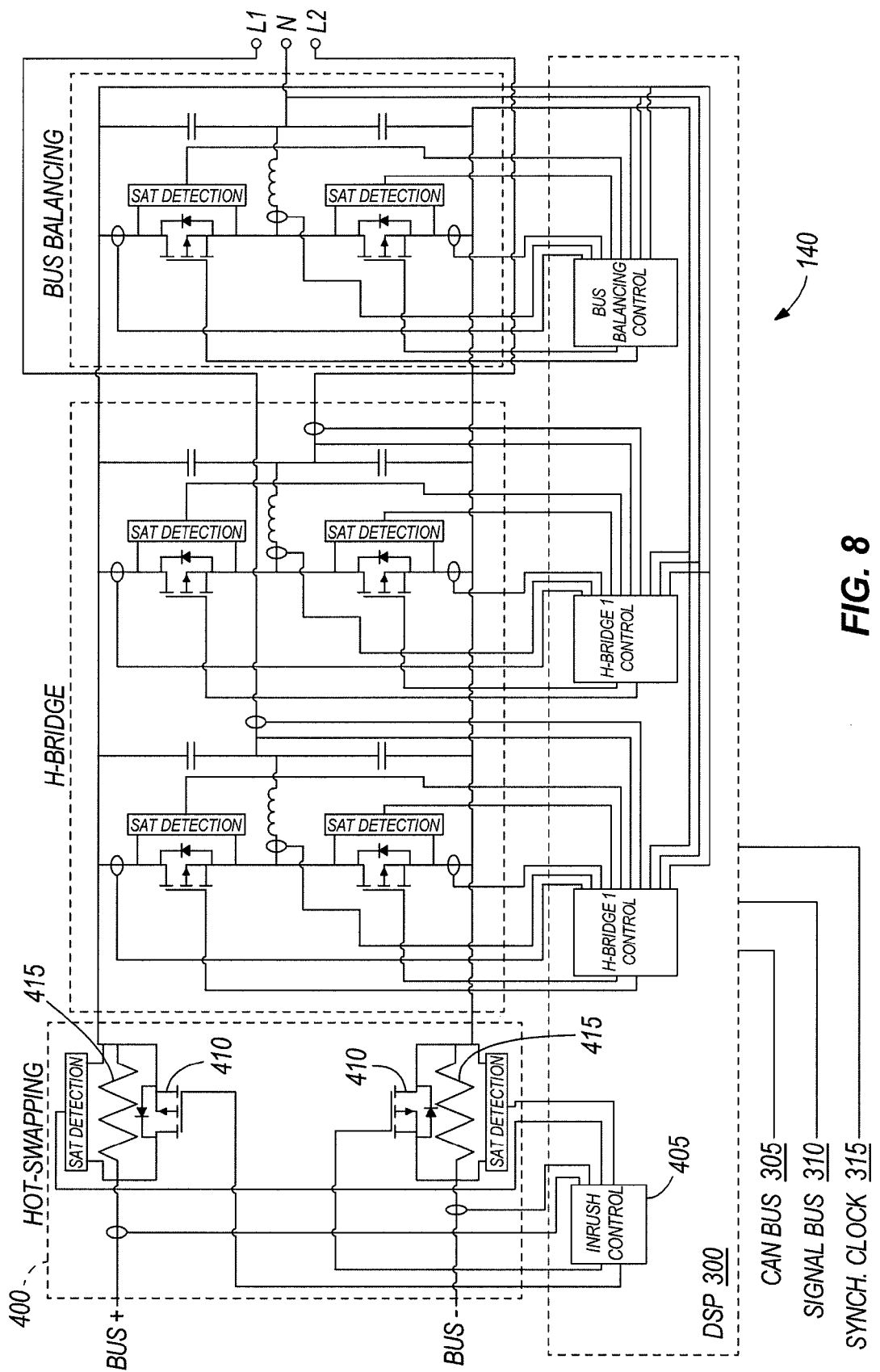
FIG. 8 depicts an exemplary inverter module according to embodiments of the invention.

As noted above, the system 100 receives power from a number of different sources, such as renewable and non-fossil fuel power sources (e.g. solar cells, wind turbines, etc.), generators (such as a natural gas generator designed to produce sufficient power for a single home), and storage devices, such as batteries. Each of these sources generates or provides electrical power, but the power provided from on source is usually different from the power provided by another source. For example, batteries might output a DC voltage of 96 volts (e.g., using eight 12 volt batteries coupled in series) whereas a wind turbine might output a DC voltage of at a different level (and that level could be subject to greater variation depending on, for example, wind speed). As a consequence, these two types of sources can be characterized as providing power of a "first type" and power of a "second type," respectively. The terminology "first type" and "second type" will be used as a shorthand to describe different power sources. FIGS. 6a, 6b, and 7 depict an exemplary PV preconditioner 255. In FIG. 6a, the PV preconditioner 255 includes two sub-preconditioner modules 350 and 355. The sub-preconditioner modules 350 and 355 are each connectable to a PV string 360 and 365 (one or more solar panels coupled together) that outputs DC power. The sub-preconditioner modules 350 and 355 act as current sources and provide DC output to the DC link bus 135. The sub-preconditioner modules are coupled to and controlled by the DSP 300.

The DSP 300 performs maximum power point tracking (MPPT) to control the current output of the sub-preconditioner modules 350 and 355 such that the DC power generated by the PV strings 360 and 365 is converted at a high efficiency (maximum power). Each sub-preconditioner module 350 and 355 is controlled individually by the DSP 300 with respect to MPPT. Therefore, if PV string 360 outputs DC voltage at a different level than PV string 365, the DSP 300 can independently adjust the DC conversion of each sub-preconditioner module 350 and 355 appropriately according to the MPPT.

Additionally, as shown in FIG. 6b, preconditioner modules can be manufactured with slots (e.g., slot 370) for receiving sub-preconditioner modules in a modular fashion. Thus, end users and manufacturers are able to construct a PV preconditioner 255 customized for a particular arrangement of PV strings. For instance, a residential end-user with two PV strings 360 and 365 that each output 3 kW of power uses two sub-preconditioner modules 350 and 355 each matched for 3 kW power output (e.g., FIG. 6a). However, a residential end-user with only a single PV string 360 uses a single sub-preconditioner module 350 (e.g., FIG. 6b). A commercial embodiment includes two PV strings 360 and 365 that each output 6 kW of power uses two sub-preconditioner modules 350 and 355 each matched for 6 kW power output (e.g., FIG. 6a).

FIG. 7 illustrates the PV preconditioner 255 of FIG. 6a. The DSP 300 includes two hot swap controllers 370 which ensure that the transistors 375 are open upon insertion or removal of the PV preconditioner 255. Having the transistors 375 open forces current through the current limiting resistors 380 and prevents spikes of in-rushing current from causing damage to internal components of the PV preconditioner 255. The DSP 300 senses voltage levels at nodes 385 and current levels at nodes 390. The PV preconditioner 255 also includes transistors 395, which are independently controllable by the DSP 300 to regulate the preconditioner boost ratio (i.e., power-in relative to power-out). The boost ratio is controlled based on the source voltage to reach a target output voltage and maximize the power efficiency of the preconditioner. For instance, the target output voltage is approximately 600 $V_{DC}$, with +300 $V_{DC}$ on the positive DC link output and −300 $V_{DC}$ on the negative DC link output. The boost ratio is adjusted to convert the received source voltage, which may be above or below the 600 $V_{DC}$, to reach the target output voltage of 600 $V_{DC}$.

Similar to the preconditioner modules 120 and generator preconditioner modules 125, the battery preconditioner modules 130 are operable to receive power from a power source (e.g., battery packs 115) and output conditioned DC power to the DC link bus 135. However, the battery preconditioner modules 130 are also operable to receive DC power from the DC link bus 135 and charge the battery packs 115. In some embodiments, the battery preconditioner modules 130 are also selectively coupled to the AC grid 155 (e.g., as a load within standard loads 165) or to the grid connection switches 145 (e.g., as an auxiliary load 160) and receive and convert AC power to charge the battery packs 115. In some embodiments, the wind turbine preconditioners are also operable to generate energy via braking their associated wind turbines.

Inverter Modules

The inverter modules 140 convert DC power received via DC link bus 135 to AC power output to the grid connection switches 145. The inverter modules 140 do not include transformers. Therefore, the components of the backplane 175, with the exception of the logic hardware operating on 5 V provided by the voltage converter 171, do not have galvanic isolation from the AC grid 155. A transformerless inverter provides a more efficient conversion from DC to AC because losses associated with a transformer are not present. In some embodiments, commercial units with larger power outputs (e.g., above 10 kW) include a line transformer on the output of the inverters. Such transformers allow the energy harvesting system 100 to connect to a 480 V three-phase grid.

The inverter modules 140 operates in either a grid-tied or off-grid mode. In the grid-tied mode, the inverter modules 140 function as an AC current source that is synchronized to the AC grid 155. In the off-grid mode, the inverter modules 140 function as an AC voltage source to power the auxiliary loads 160. If the system controller 170 detects that the AC grid 155 is outside of a particular tolerance (e.g., a voltage tolerance, a frequency tolerance, or an impedance tolerance), the system controller 170 instructs DSPs 300 to shut down their related inverter modules (anti-islanding) or disconnects the AC grid 155 from the energy harvesting system 100 (intentional islanding) and causes the inverter modules 140 to function in an off-grid mode. The system controller 170 detects that the AC grid 155 is outside of a particular tolerance using an active circuit.

Each of the inverter modules 140 is operable to output 240 V split-phase AC power to power auxiliary loads 160, AC grid 155, or both. Additionally, use of three inverter modules 140 enables output of 277 V, three-phase AC power from the energy harvesting system 100, with one inverter module 140 assigned to each leg of the three-phase output by the system controller 170.

When operating in a grid-tied mode, the inverter modules 140 are commanded by the system controller 170 to generate a specific portion of the AC output current. In some situations, a single inverter module 140 (or at least fewer than all of the inverter modules 140) is operable to generate all the AC output current necessary based on the current requested by the system controller 170. In such situations, the system controller 170 is operable to disable the unnecessary inverter modules 140.

When operating in an off-grid mode, the inverter modules 140 operate as AC voltage sources in parallel, where generated current is equally shared among the inverter modules 140 to maintain voltage regulation.

FIG. 7 depicts an exemplary circuit diagram for an inverter module 140. Similar to the preconditioner modules 120, the inverter module 140 includes hot swapping circuitry. The hot-swapping circuitry 400 includes an inrush control module 405, which is part of the DSP 300 in some embodiments. The inrush control module ensures that the transistors 410 are open upon insertion or removal of the inverter module 140. Having the transistors 375 open forces current through the current limiting resistors 415 and prevents spikes of in-rushing current from causing damage to internal components of the inverter module 140.

The inverter module 140 includes transistors 420, which may be MOSFET transistors controlled at a switching frequency of 50 kHz or greater. In some embodiments, the transistors 420 are 600 V CoolMOS (MOSFET) transistors produced by Infineon Technologies (part number SPW52N50C3). The transistors 420 receive DC power from DC link bus 135 and, via switching on and off based on control signals from the H-bridge control modules 425, the transistors 420 collectively output split-phase AC power along outputs L1, L2, and N. The bus balancing circuit is able to compensate for imbalances on the L1 and L2 outputs. The bus balancing circuit is operable to handle up to a 100% imbalance on either the L1 or L2 output, which allows for intentional and unintentional load balancing.

Sink Circuit

As mentioned above, the inverter modules 140 have a transformerless design. As such, there is no grounding connection provided between the inverter modules 140 and preconditioner modules 120. To account for the potentially high levels of DC voltage present on the DC link bus 135 and the hotswapping functionality of the backplane 175, sink circuits 285 are coupled to the DC link bus 135. When an inverter module 140 or preconditioner module 120 are detected as being removed from the backplane 175, the sink circuits 285 are activated to sink (i.e., dissipate) stored voltage and current resident on the DC link bus 135. The sink circuits 285 include resistors that are selectively coupled between the DC link bus and a neutral wire to dissipate stored voltage and current quickly. In some embodiments, the sink circuits 285 are provided within each inverter module 140 and preconditioner module 120 or as part of the backplane 175.

User Interfacing

The energy harvesting system 100 includes multiple user interfaces. As depicted in FIG. 5, the system controller 170 includes the UI processor 335. The UI processor 335 acts as the gateway between the energy harvesting system 100 and user interfacing devices including, for instance, a local liquid crystal display (LCD) touch screen 450, a local computing device 455, a mobile computing device 460 (e.g., a smart phone, tablet computer, etc.), a user personal computers 465, or a maintenance computer 470.

Figure 9:
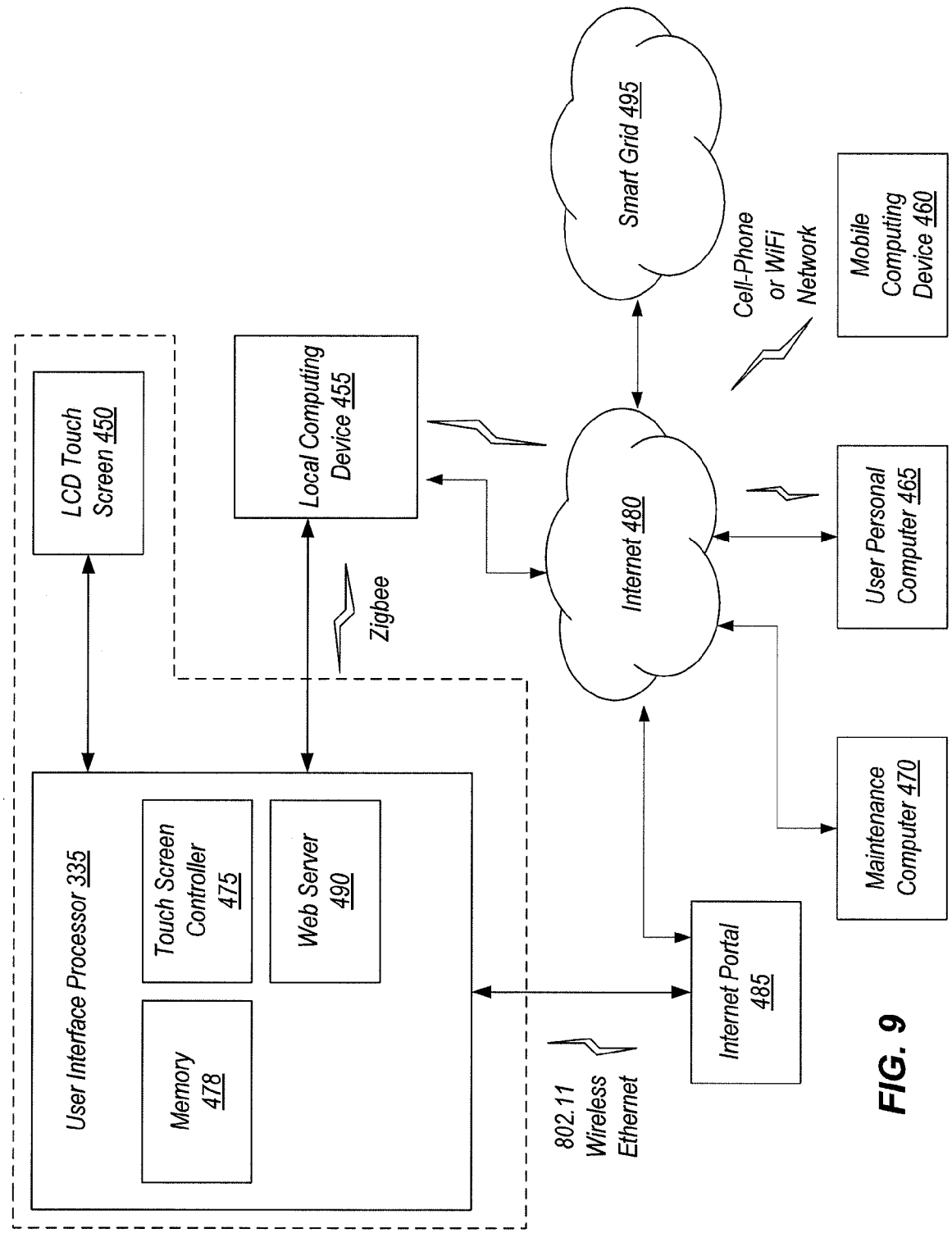
FIG. 9 depicts user input devices coupled to a user interface processor according to embodiments of the invention.

In FIG. 9, the energy harvesting system 100 includes the LCD touch screen 450 (i.e., LCD 450). The UI processor 335 includes a touch screen controller 475 to control the display of information on LCD 450 and to receive user input from the LCD 450. The LCD 450 displays information from the energy harvesting system 100, including statistics related to power generation, operability of various components, and other system information. For instance, the real time processor 330 monitors and stores information related to power generation and the operability of various components within a memory. The UI processor 335 communicates with the real time processor 330, e.g., using a CAN bus, to retrieve the stored information. Thereafter, the UI processor 335 saves the information in memory 478 and displays the retrieved information on the LCD 450 via the touch screen controller 475. Exemplary information displayed by the LCD 450 includes energy harvesting system 100 status, alarms, operating mode, output voltage, output current, output power frequency, carbon dioxide emissions reduced and money saved (based on power supplied by the energy harvesting system 100), network settings, date, time, and, for each preconditioner module, input voltage, input current, and input power. This data is operable to be shown in real-time and grouped together for daily, weekly, monthly, yearly, etc. display Additionally, the LCD 450 receives user input to set-up and control various settings of the energy harvesting system 100. For instance, a user can input user preferences for providing energy harvested by the energy harvesting system 100 to auxiliary loads 160 and the AC grid 155. In other embodiments, either in place of or in addition to the LCD touch screen 450, a display screen and other user input devices (e.g., a keyboard, mouse, etc.) are provided in the energy harvesting system 100 to perform functions similar to the LCD touch screen 450.

The local computer device 455 is coupled to the UI processor 335 via a wired or wireless connection. The wired connection is, for instance, an Ethernet cable, a universal serial bus (USB) cable, or other similar connection for data transfer. The wireless connection is, for instance, a blue tooth connection, Zigbee connection, or wireless Ethernet connection, or other similar wireless connection for data transfer. In some embodiments, the local computer device 455 is used in place of or in addition to the LCD 450 for receiving user input and displaying information. In an exemplary implementation of the energy harvesting system 100 in a residential setting (where the system is located, e.g., in a basement or garage), a user is able to receive and enter information from another location within the house using the local computing device 455, which is directly connected to the energy harvesting system 100. In some embodiments, the local computer device 455 is a laptop computer, personal computer, a tablet computer, a smart phone, another mobile computer device, a smart appliance control, or a smart grid interface device (e.g., a smart electric meter).

The mobile computer device 460, user personal computer 465, and maintenance computer 470 function similarly to the local computer device 455, but are coupled to the energy harvesting system 100 via the Internet 480. The UI processor 335 is coupled to an internet portal 485, either via a wired or wireless connection such as an Ethernet or wireless Ethernet connection. The internet portal 485 is, for instance, a router or hub, that is linked to the Internet 480. In some embodiments, the UI processor 335 is coupled to the Internet 480 via a wired or wireless connection of the local computer device 455. The UI processor 335 is operable to connect to the Internet via various wired or wireless connection paths that are direct or indirect and should not be limited to the connections depicted in FIG. 9. Similarly, the mobile computing device 460, user personal computer 465, and maintenance computer 470 are coupled to the Internet 480 via various wired or wireless connection paths that are direct or indirect. For instance, the mobile computing device 460 is an iPhone™, Blackberry™, or another smart phone, which connects to the Internet via a cell phone network or WiFi network.

The UI processor 335 is also operable to communicate with a smart grid 495. The UI processor 335 is able to communicate to the smart grid the available power capacity of the energy harvesting system 100. Additionally, the smart grid 495 is able to communicate to the UI processor 335 a desired power output of the energy harvesting system 100, electricity usage, electricity demand, and billing rate information. The smart grid 495 is also able to communicate with smart appliances to determine load requirements and to request smart appliances to reduce power consumption (e.g., based on a utility company request). The smart appliances communicate load requirements and electricity usage to the smart grid.

Figure 10:
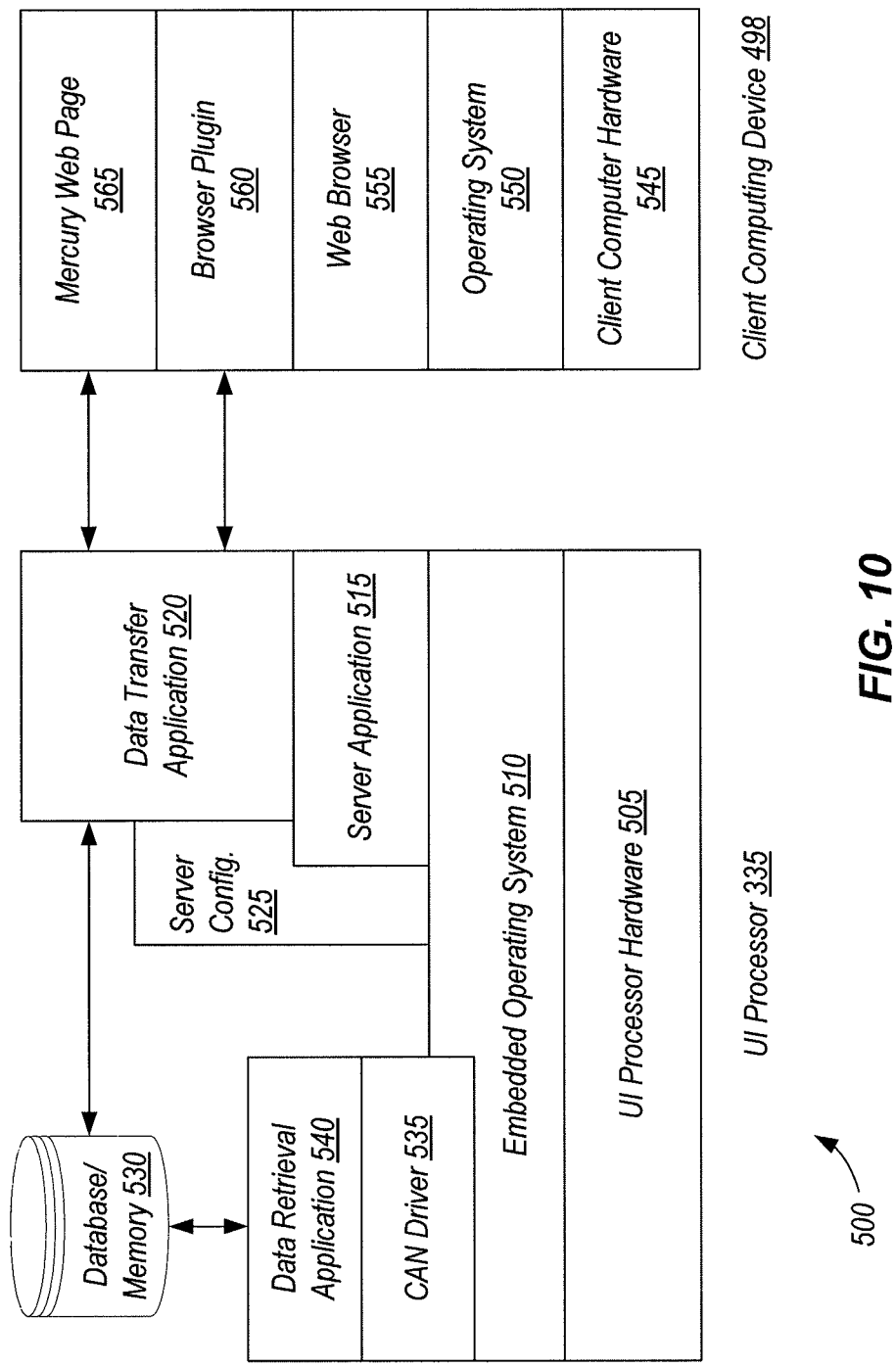
FIG. 10 depicts an exemplary web server architecture according to embodiments of the invention.

The UI processor 335 includes a web server 490, which communicates with the mobile computer device 460, user personal computer 465, and maintenance computer 470. An exemplary web server architecture 500 illustrated in FIG. 10. The left half of FIG. 10 depicts software and hardware of the UI processor 335 used in the web server architecture 500. The right half of FIG. 10 depicts software and hardware on a client computing device 498, such as the mobile computing device 460, user personal computer 465, and maintenance computer 470, and local computing device 455.

The UI processor 335 includes UI processor hardware 505 to execute computer programs, including an embedded operating system 510. The embedded operating system 510 is, for example, Linux. The operating system 510 manages the interaction between other computer programs and the UI processor hardware 505 and the resource allocation of the UI processor 335. The server application 515 controls the operation of the data transfer application 520. The server application 515 receives and handles data requests and messages from the client computer device 498 received by the data transfer application 520. Additionally, the server application 515 sends data and messages to the client computer device 498 using the data transfer application 520. In some embodiments, the server application 515 is software produced under the name Apache. The server configuration data 525 is a set of server application 515 settings used by the server application 515 and data transfer application 520. The operating system 510 forwards requests from the server application 515 for data from the database 530. The database 530 resides on the UI processor 335, the real time processor 330, or as a separate memory device within the energy harvesting system 100. In response to a data request, the operating system 510 forwards the request to the CAN driver 535 and data retrieval application 540, which send a data request to the database 530. The data returned from the database 530 is sent back to the server application 515 via the data retrieval application 540, CAN driver 535, and operating system 510. In some instances, the data is returned directly to the data transfer application and routed on to the client computing device 498.

The client computer device 498 includes computer hardware 545 for executing computer programs, such as the operating system 550. The operating system 550, similar to the operating system 510, manages the interaction between other computer programs and computer hardware (i.e., computer hardware 545). The operating system 550 is, for instance, Windows, Linux, OS X, or another operating system. A web browser 555, such as Internet Explorer, Chrome, Firefox, Safari, etc., is executed by the computer hardware 545, as is a browser plugin 560, such as Silverlight.

The data transferred from the UI processor 335 to the client computer device 498 includes web page data for display as a web page 565 by the web browser 555 and browser plugin 560. The web page data includes, for example, energy harvesting system 100 status, alarms, operating mode, output voltage, output current, output power frequency, carbon dioxide emissions reduced and money saved (based on power supplied by the energy harvesting system 100), network settings, date, time, and, for each preconditioner module, input voltage, input current, and input power. This data is operable to be shown in real-time and grouped together for daily, weekly, monthly, yearly, etc. display.

In some embodiments, particularly in relation to the maintenance computer 470, service options are available to a client computer device 498. For instance, service personnel using the maintenance computer 470 receive information for debugging purposes. Additionally, service personnel are able to reconfigure energy harvesting system 100 settings, such as server configurations 525. In some embodiments, the maintenance computer 470 is operable to directly connect to the UI processor 335 similar to the connection between the local computing device 455. Exemplary information provided to the maintenance computer 470 includes system logs, information indicating whether the operating mode is grid-tied or off grid, preconditioner and inverter module logs, firmware upgrade interface, total system use, total power output, hours of operation for each preconditioner and inverter module. In some embodiments, the maintenance computer 470 is allowed greater access to data stored on the energy harvesting system 100 and greater flexibility in altering configuration data of the energy harvesting system 100 than other user-interfacing devices. In addition, some energy harvesting system 100 settings are alterable (both locally or remotely) including program timings that indicate when to push power to the AC grid 155 and when to retain locally generated power at a local level (e.g., for auxiliary loads 160 and standard loads 165). The energy harvesting system 100 is also remotely and locally programmable to communicate with a smart thermostat to alter thermostat settings and schedules based on time of day, week, month, etc., weather, available power (from the AC grid 155 and energy harvesting system 100).

Figure 11:
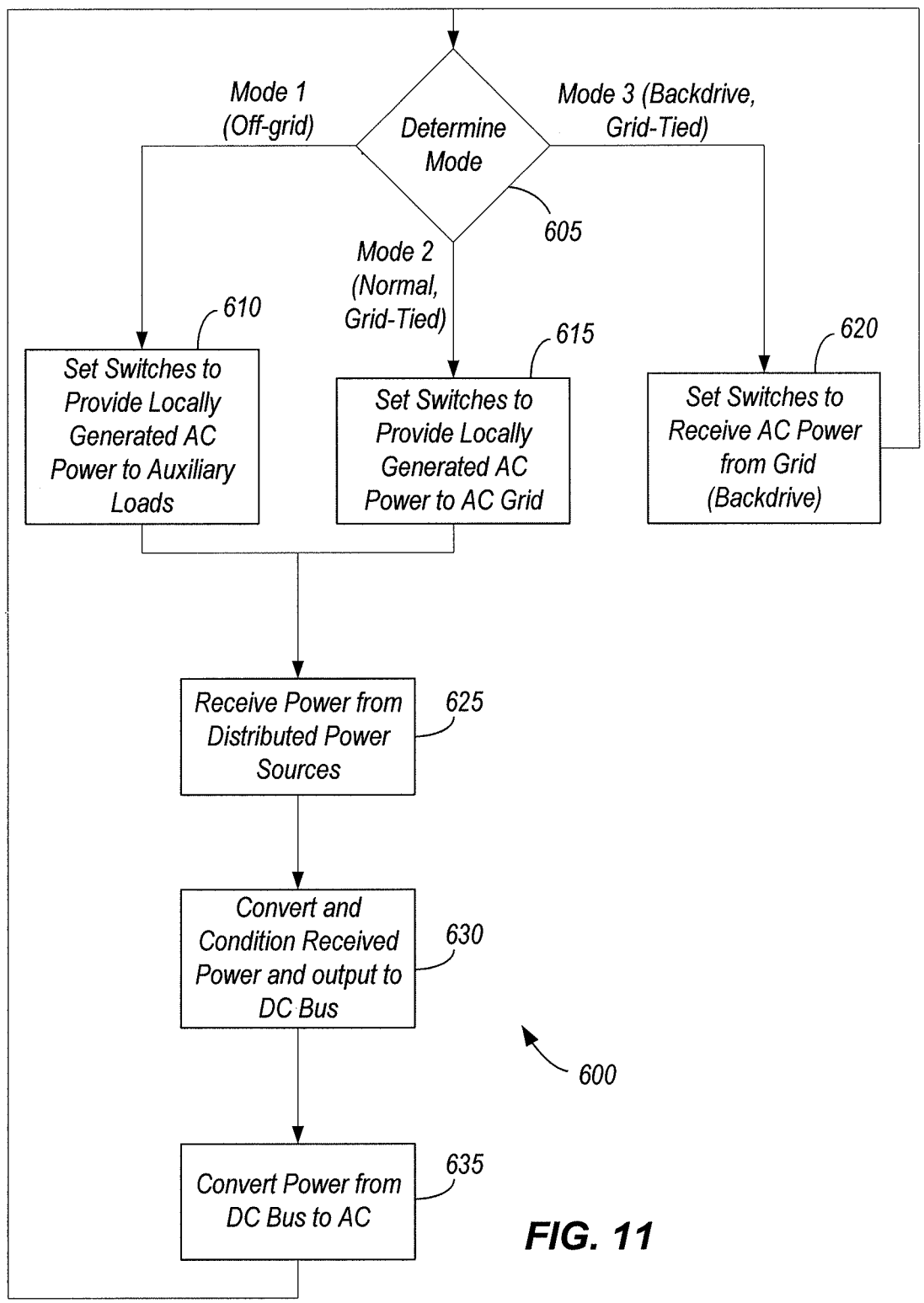
FIG. 11 depicts a method of harvesting energy according to embodiments of the invention.

FIG. 11 depicts a method 600 of harvesting energy using the energy harvesting system 100. In step 605, the energy harvesting system 100 determines the mode of operation: 1) backdrive (grid-tied), 2) normal operation (grid-tied), or 3) local power generation (off-grid). The mode is determined by, e.g., the evaluation of the AC grid 155 by the system controller 170, user input, or information received from the smart grid 495. For instance, the system controller 170 detects when the AC grid 155 is operating in a blackout or brownout condition, or is otherwise outside of particular thresholds. In response, in step 610, the system controller 170 controls the grid connection switches 145 to open the connections between the AC grid 155 and the energy harvesting system 100 (off-grid). The system controller 170 is also operable to control the grid connection switches 145 to cause the energy harvesting system 100 to operate off-grid in response to a user request to do so (e.g., via LCD 450) or in response to user pre-set conditions being satisfied.

In a second mode (step 615), the AC grid 155 is operating within set thresholds and the system controller 170 controls the grid connection switches 145 to close the connections between the energy harvesting system 100 and the AC grid 155 (grid-tied). In this normal, grid-tied mode, the energy harvesting system 100 provides locally generated AC power to the AC grid 155 (often for a fee). In a third mode (step 620), the energy harvesting system 100 is coupled to the AC grid 155 by the grid connection switches 145 (grid-tied), but does not provide locally generated power to the AC grid 155 or to auxiliary load 160. Rather, the AC grid 155 provides power to auxiliary loads 160 and backplane hardware and, in some instances, to the battery packs 115. The energy harvesting system 100 remains in a particular mode until the system controller 170 determines to change a mode, e.g., because of a user request or change in operation of the AC grid 155.

If operating in mode 1 (off-grid) or mode 2 (normal, grid-tied), the energy harvesting system 100 proceeds to step 625. In step 625, the energy harvesting system 100 receives power from distributed power sources, such as one or more renewable power sources 105, generators 110, and battery packs 115. The received power is converted and conditioned by preconditioner modules 120 in steps 630, and output as DC power to the DC link bus 135. In step 635, the inverter modules 140 receive and convert the DC power from the DC link bus 135 to AC power. If operating in mode 1 (off-grid), the generated AC power is output to the auxiliary loads 160. If operating in mode 2 (normal, grid-tied), the generated AC power is output to the AC grid 155.

Although not depicted, the system controller 170 is also operable to cause the energy harvesting system 100 to operate in a fourth mode (off-grid), where the pre-conditioners and inverters 140 are disabled to cease energy harvesting by the energy harvesting system 100. The fourth mode essentially disables the energy harvesting system 100 and is entered, for instance, in response to removal of a preconditioner module 120 or inverter module 140 or in response to a user command entered via a user interfacing device.

Although the steps of method 600, including step 605 (determine mode) is depicted as sequential steps carried out in series, one or more of the steps are performed in parallel. For instance, the system controller 170 is continuously monitoring for a mode-change in some embodiments throughout execution of method 600. Furthermore, power is continuously being received from distributed power sources (step 625), converted and conditioned to DC power (step 630), and converted to AC power (step 635) when operating in the first (off-grid) mode and second, normal (grid-tied) mode.

Thus, the invention provides, among other things, a system and method for harvesting energy from distributed power sources. The distributed power sources include renewable and nonrenewable systems and are coupled to a backplane. The backplane is receives modular preconditioner modules and inverter modules, which are inserted into module slots. The preconditioner modules receive power from the distributed power sources via backplane connections and output conditioned DC power to a DC bus. The inverters are coupled to the DC bus, receive the DC power, and convert the DC power to AC power. The backplane also includes a controller for selectively coupling the energy harvesting system to a power grid. The AC power generated by the inverter is also selectively applied by the controller to the power grid and to local loads.

The modular energy harvesting system enables various combinations of energy sources, preconditioner modules, and inverter modules interfacing with a single backplane. Thus, the energy harvesting system and backplane are applicable in various residential and commercial scenarios. The hotswappable design and selective coupling to the AC grid and local loads provides an easy-to-use, easy-to-customize, and easy-to-alter energy harvesting system. Various features and advantages of the invention are set forth in the following claims.

What is claimed is:

1. A modular energy harvesting portal comprising:
    a first preconditioner including a first DC output and a first power input connectable to a first source, the first preconditioner configured to convert a first type of power provided from the first source to a first DC level, and output the converted power at the first DC level;
    a second preconditioner including a second DC output and a second power input connectable to a second source, the second preconditioner configured to convert a second type of power provided from the second source to the first DC level, and output the converted power at the first DC level;
    a first inverter including a first DC input and a first AC output, the first inverter converting DC power received at the first DC input to AC power and outputting AC power at the first AC output;
    a second inverter including a second DC input and a second AC output, the second inverter converting DC power received at the second DC input to AC power and outputting AC power at the second AC output;
    a controller configured to communicate with the first inverter, second inverter, first preconditioner, and second preconditioner;
    a backplane including
        first and second preconditioner slots for receiving the first preconditioner and the second preconditioner,
        first and second inverter slots for receiving the first inverter and the second inverter,
        a DC bus connecting the first DC output, second DC output, first DC input, and second DC input, and
        an AC output bus connecting the first AC output and second AC output, wherein the controller selectively couples the AC output bus to an AC grid; and
    a sink circuit coupled to the DC link bus and operable to selectively dissipate power resident on the DC link bus, wherein the sink circuit is activated to dissipate power resident on the DC link bus in response to removal from the backplane of at least one selected from the group of the first preconditioner, the second preconditioner, the first inverter, and the second inverter.

2. The energy harvesting portal of claim 1, wherein the backplane further includes
   a first source input port configured to be coupled to the first source to supply power to the first power input, and
   a second source input port configured to be coupled to the second source to supply power to the second power input.

3. The energy harvesting portal of claim 1, wherein the controller selectively couples:
   a local load to one selected from the group of the AC grid and the AC output bus; and
   the AC output bus to one selected from the group of the local load and the AC grid.

4. The energy harvesting portal of claim 3, further comprising grid connection switches on the backplane, wherein the grid connection switches are controlled by the controller for the selective coupling of the local load to one selected from the group of the AC grid and the AC output bus and the AC output bus to one selected from the group of the local load and the AC grid.

5. The energy harvesting portal of claim 1, further comprising a third preconditioner external to the backplane and coupled to the DC bus, wherein the preconditioner receives power from a third source, converts the received power to the first DC level, and outputs the converted power at the first DC level to the DC bus.

6. The energy harvesting portal of claim 5, wherein the third source is a battery pack and the third preconditioner is further configured to charge the battery pack using DC power from the DC bus output by the first preconditioner and the second preconditioner.

7. The energy harvesting portal of claim 1, wherein the first and second source are different renewable energy power sources and the first preconditioner is customized for use with the first source and the second preconditioner is customized for use with the second source.

8. The energy harvesting portal of claim 1, further comprising a fourth preconditioner including a fourth power input and a fourth DC output for use with a fourth source, wherein, upon removal of the first preconditioner from the first preconditioner slot, the fourth preconditioner is
   insertable into the first preconditioner slot to couple the fourth source to the fourth power input and the to couple the fourth DC output to the DC bus, and
   configured to convert power provided from the fourth source to a first DC level, and output the converted power at the first DC level.

9. The energy harvesting portal of claim 1, wherein the controller is operable to disable one selected from the group of the first inverter and the second inverter based on a determination that a single inverter is operable to meet the demand for AC to DC conversion.

10. The energy harvesting portal of claim 1, wherein the AC output bus is electrically coupled to one selected from the group of a second AC output bus of a second energy harvesting portal and a series preconditioner of the second energy harvesting portal.

11. The energy harvesting portal of claim 1, wherein the DC bus is electrically coupled to a second DC bus of a second energy harvesting portal.

12. The energy harvesting portal of claim 1, wherein the sink circuit is integrated into the backplane.

13. The energy harvesting portal of claim 1, wherein the first preconditioner includes
    a first subpreconditioner including a first sub-output, wherein the first subpreconditioner
        is connected to the first power input, the first power input being connected to a first photovoltaic string,
        converts power provided from the first photovoltaic string to the first DC level, and
        outputs, via the first sub-output, the converted power at the first DC level;
    a second subpreconditioner including a second sub-output, wherein the second subpreconditioner
        is connected to a second power input, the second power input being connected to a second photovoltaic string,
        converts power provided from the second photovoltaic string to the first DC level,
        outputs, via the second sub-output, the converted power at the first DC level;
    a connection point coupling the first and second sub-outputs to first DC output of the first preconditioner.

14. The energy harvesting portal of claim 1, wherein the controller is part of the backplane and includes:
    a real time processor controlling the first and second preconditioners and the first and second inverters, and
    a user interface processor in communication with an external user device,
    wherein the user interface processor and the real time processor are communicatively coupled.

15. The energy harvesting portal of claim 1, wherein the backplane further comprises
    a controller area network (CAN) bus linking the controller to a processor of at least one selected from the group of the first preconditioner, the second preconditioner, the first inverter, and the second inverter, the CAN bus used to transmit instructions from the controller and data to the controller; and
    a signals bus linking the controller to the processor and used to communicate from the controller at least one selected from the group of a reset signal, a get ready to shutdown power signal, a shutdown power immediately signal, a sleep signal, a wakeup signal, and an island detected signal.

16. The energy harvesting portal of claim 15, wherein the backplane further comprises synchronization clock line linking the controller to the processor.

* * * * *